US012743605B2

(12) United States Patent
Oshima et al.

(10) Patent No.: US 12,743,605 B2
(45) Date of Patent: Sep. 22, 2026

(54) INFORMATION PROCESSING SYSTEM AND INFORMATION PROCESSING METHOD

(71) Applicant: HITACHI, LTD., Tokyo (JP)

(72) Inventors: Takashi Oshima, Tokyo (JP); Norikatsu Takaura, Tokyo (JP); Masanao Yamaoka, Tokyo (JP); Yoshitaka Sasago, Tokyo (JP)

(73) Assignee: Hitachi, Ltd., Tokyo (JP)

(*) Notice: Subject to any disclaimer, the term of this patent is extended or adjusted under 35 U.S.C. 154(b) by 1067 days.

(21) Appl. No.: 17/335,283

(22) Filed: Jun. 1, 2021

(65) Prior Publication Data

US 2022/0101099 A1 Mar. 31, 2022

(30) Foreign Application Priority Data

Sep. 29, 2020 (JP) ................................ 2020-163303

(51) Int. Cl.
*G06N 3/047* (2023.01)
*G06N 3/045* (2023.01)
(Continued)

(52) U.S. Cl.
CPC ............ *G06N 3/045* (2023.01); *G06N 3/047* (2023.01); *G06N 3/065* (2023.01); *H04Q 9/00* (2013.01);
(Continued)

(58) Field of Classification Search
CPC ........ G06N 3/045; G06N 3/047; G06N 3/065; G06N 3/044; G06N 3/082; G06N 3/084;
(Continued)

(56) References Cited

U.S. PATENT DOCUMENTS

2005/0213827 A1* 9/2005 Chen ...................... H04N 19/60 375/E7.137
2006/0251124 A1* 11/2006 Colmant .............. H04L 49/153 370/503

(Continued)

FOREIGN PATENT DOCUMENTS

JP 2017-157215 A 9/2017
JP 2018-206127 A 12/2018

(Continued)

OTHER PUBLICATIONS

Japanese Office Action issued on Mar. 12, 2024 for Japanese Patent Application No. 2020-163303.

(Continued)

*Primary Examiner* — Mohamed Abou El Seoud
(74) *Attorney, Agent, or Firm* — Volpe Koenig

(57) ABSTRACT

According to one embodiment, provided is an information processing system including a parent device and a plurality of child devices. The child device constitutes at least a portion of at least one device selected from a function approximator and an annealing machine, each of the parent devices and the plurality of child devices include a communication interface, and the communication interface is at least one selected from a wireless communication interface and a wired communication interface including an analog circuit. Data to be processed by the child device is transmitted from the parent device to at least one of the plurality of child devices, and an output of at least one node of the child device is transmitted to at least one of the parent device and the other child devices.

12 Claims, 14 Drawing Sheets

(51) Int. Cl.
*G06N 3/065* (2023.01)
*H04Q 9/00* (2006.01)

(52) U.S. Cl.
CPC ..... *H04Q 2209/30* (2013.01); *H04Q 2209/40* (2013.01)

(58) Field of Classification Search
CPC ........ G06N 5/01; G06N 20/20; G06N 3/0442; G06N 3/09; G06N 3/092; G06N 3/098; G06N 3/0464; G06N 3/0495; H04Q 9/00; H04Q 2209/30; H04Q 2209/40
See application file for complete search history.

(56) References Cited

U.S. PATENT DOCUMENTS

2017/0255790 A1* 9/2017 Barrett ................ G06F 21/6245
2017/0255859 A1* 9/2017 Tan .......................... G06N 3/02
2017/0351947 A1* 12/2017 Tamura .................... G06N 3/04
2018/0349325 A1 12/2018 Okuyama et al.
2019/0261439 A1* 8/2019 Itagaki .................. H04W 76/11
2020/0379454 A1* 12/2020 Trinh ................... G05B 23/024
2022/0383166 A1* 12/2022 Griffith .................. G06N 3/044

FOREIGN PATENT DOCUMENTS

JP 2020-027375 A 2/2020
JP 2020-035179 A 3/2020
JP 2020-136788 A 8/2020
WO 2020101457 A2 5/2020
WO WO-2020255634 A1 * 12/2020 ............ G06N 10/60

OTHER PUBLICATIONS

Japanese Office Action dated Jul. 30, 2024 for Japanese Patent Application No. 2020-163303.

* cited by examiner

| PATTERN | FLOW OF PROCESSING |
|---|---|
| 1 | SENSOR → FEATURE EXTRACTION → PREDICTION → ACTION PLANNING |
| 2 | SENSOR → FEATURE EXTRACTION → ACTION PLANNING |
| 3 | SENSOR → PREDICTION → ACTION PLANNING |
| 4 | SENSOR → FEATURE EXTRACTION → PREDICTION |
| 5 | SENSOR → PREDICTION |
| 6 | SENSOR → ACTION PLANNING |

105 WIRELESS INTERFACE

804 DATA REVERSIBLE COMPRESSION/ DECOMPRESSION UNIT

805 NEURON

FIG. 8C

| DEVICE | CORRESPONDENCE OF EACH LAYER OF RESERVOIR COMPUTING | TRANSMISSION DATA | TRANSMISSION DESTINATION |
|---|---|---|---|
| INPUT UNIT 801 OF SERVER | INPUT LAYER | SYNCHRONIZATION SIGNAL INPUT DATA | RESERVOIR 102-1 ~ 102-4 |
| RESERVOIR 102-1 | PORTION OF RESERVOIR LAYER | NODE OUTPUT | RESERVOIR 102-2, 102-3, 102-4, SERVER 104 |
| RESERVOIR 102-2 | PORTION OF RESERVOIR LAYER | NODE OUTPUT | RESERVOIR 102-1, 102-3, 102-4, SERVER 104 |
| RESERVOIR 102-3 | PORTION OF RESERVOIR LAYER | NODE OUTPUT | RESERVOIR 102-1, 102-2, 102-4, SERVER 104 |
| RESERVOIR 102-4 | PORTION OF RESERVOIR LAYER | NODE OUTPUT | RESERVOIR 102-1, 102-2, 102-3, SERVER 104 |
| OUTPUT UNIT 803 OF SERVER | OUTPUT LAYER | ONLY RECEPTION | ONLY RECEPTION |

FIG. 8D

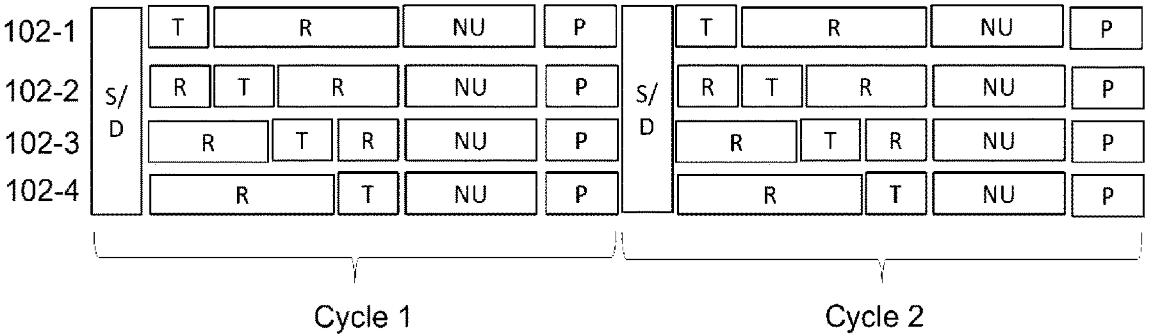

FIG. 9A

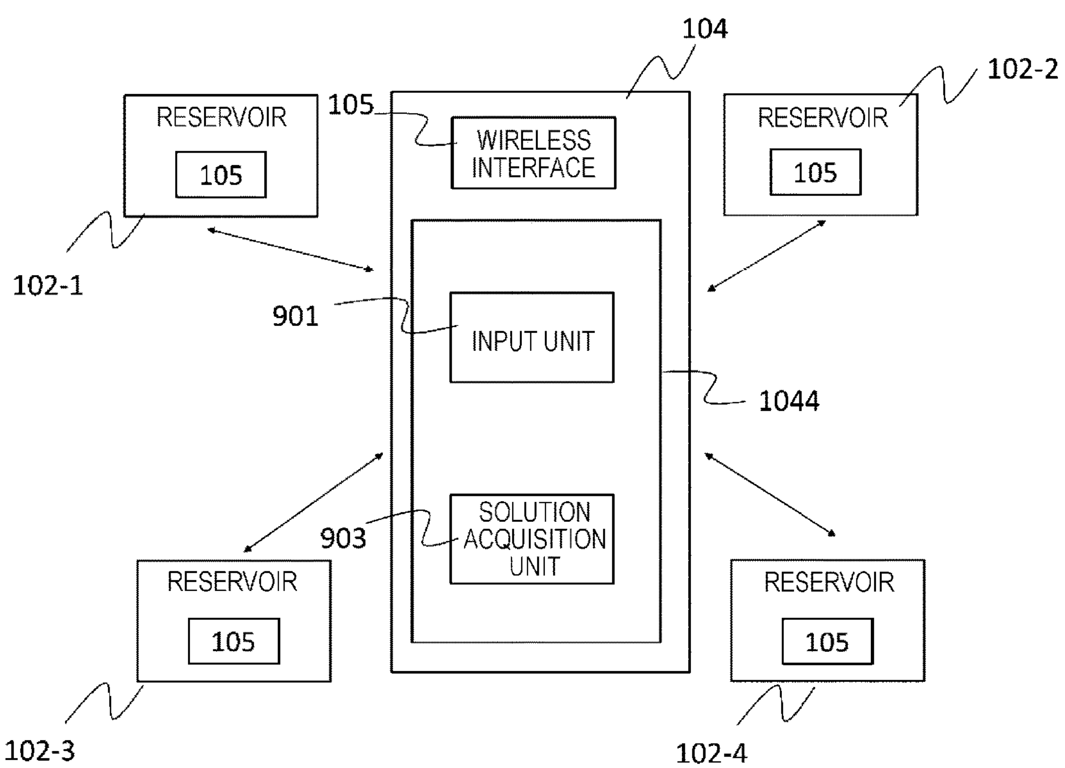

FIG. 9B

| DEVICE | CORRESPONDENCE OF EACH LAYER OF RESERVOIR COMPUTING | TRANSMISSION DATA | TRANSMISSION DESTINATION |
|---|---|---|---|
| INPUT UNIT 901 OF SERVER | INPUT LAYER | INPUT DATA | RESERVOIR 102-1 ~ 102-4 |
| RESERVOIR 102-1 | RESERVOIR LAYER AND OUTPUT LAYER | OUTPUT OF OUTPUT LAYER | SERVER 104 |
| RESERVOIR 102-2 | RESERVOIR LAYER AND OUTPUT LAYER | OUTPUT OF OUTPUT LAYER | SERVER 104 |
| RESERVOIR 102-3 | RESERVOIR LAYER AND OUTPUT LAYER | OUTPUT OF OUTPUT LAYER | SERVER 104 |
| RESERVOIR 102-4 | RESERVOIR LAYER AND OUTPUT LAYER | OUTPUT OF OUTPUT LAYER | SERVER 104 |
| SOLUTION ACQUISITION UNIT 903 OF SERVER | NO | ONLY RECEPTION | ONLY RECEPTION |

FIG. 10B

| DEVICE | CORRESPONDENCE OF EACH LAYER OF DNN | TRANSMISSION DATA | TRANSMISSION DESTINATION |
|---|---|---|---|
| INPUT UNIT 1001 OF SERVER | INPUT LAYER | SYNCHRONIZATION SIGNAL INPUT DATA | DNN101-1 |
| DNN101-1 | FIRST CONVOLUTION LAYER + POOLING LAYER | OUTPUT OF POOLING LAYER | DNN101-2 |
| DNN101-2 | SECOND CONVOLUTION LAYER + POOLING LAYER | OUTPUT OF POOLING LAYER | DNN101-3 |
| DNN101-3 | THIRD CONVOLUTION LAYER + POOLING LAYER | OUTPUT OF POOLING LAYER | DNN101-4 |
| DNN101-4 | FOURTH CONVOLUTION LAYER + POOLING LAYER | OUTPUT OF POOLING LAYER | SERVER 104 |
| OUTPUT UNIT 1003 OF SERVER | OUTPUT LAYER | ONLY RECEPTION | ONLY RECEPTION |

FIG. 11

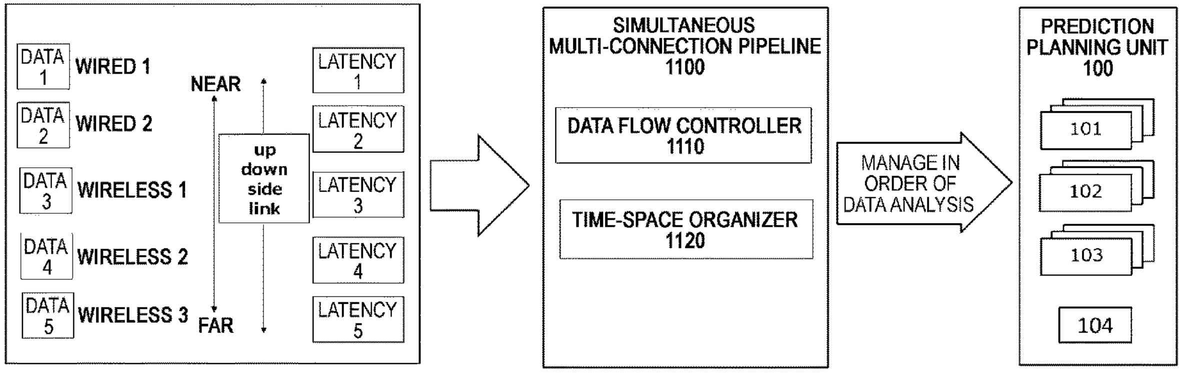

FIG. 14

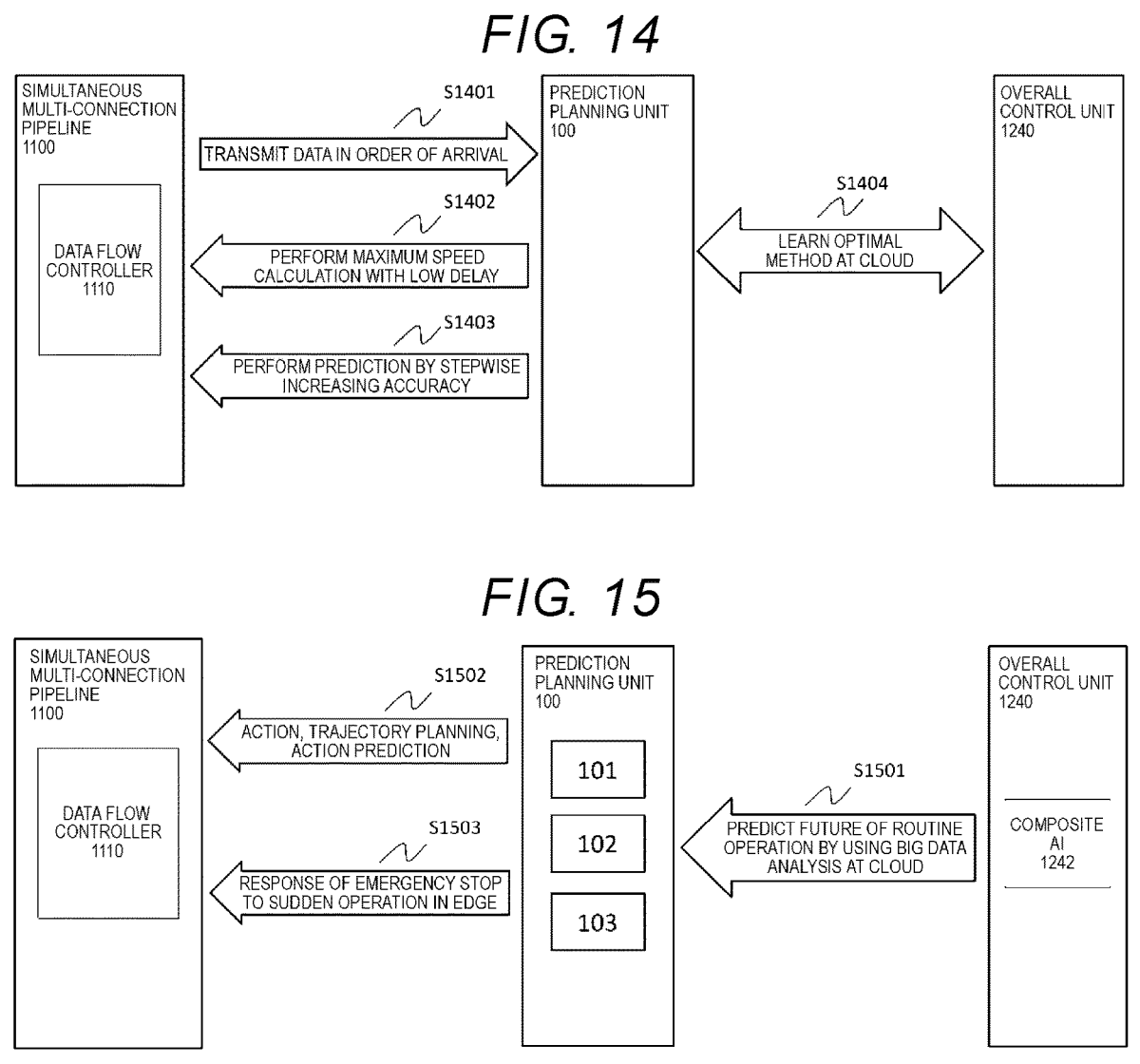

SIMULTANEOUS MULTI-CONNECTION PIPELINE 1100
DATA FLOW CONTROLLER 1110
S1401
TRANSMIT DATA IN ORDER OF ARRIVAL
S1402
PERFORM MAXIMUM SPEED CALCULATION WITH LOW DELAY
S1403
PERFORM PREDICTION BY STEPWISE INCREASING ACCURACY
PREDICTION PLANNING UNIT 100
S1404
LEARN OPTIMAL METHOD AT CLOUD
OVERALL CONTROL UNIT 1240

FIG. 15

SIMULTANEOUS MULTI-CONNECTION PIPELINE 1100
DATA FLOW CONTROLLER 1110
S1502
ACTION, TRAJECTORY PLANNING, ACTION PREDICTION
S1503
RESPONSE OF EMERGENCY STOP TO SUDDEN OPERATION IN EDGE
PREDICTION PLANNING UNIT 100
101
102
103
S1501
PREDICT FUTURE OF ROUTINE OPERATION BY USING BIG DATA ANALYSIS AT CLOUD
OVERALL CONTROL UNIT 1240
COMPOSITE AI 1242

INFORMATION PROCESSING SYSTEM AND INFORMATION PROCESSING METHOD

BACKGROUND OF THE INVENTION

1. Field of the Invention

The present invention relates to a technique for processing data collected by using a communication means.

2. Description of Related Art

With the increase in speed and functionality of communication technology and sensors, the entire wide-area social system has been enabled to connect across persons and objects such as automobiles and robots. In such an IoT (Internet of Things) environment, the concept of a digital twin in which information of a physical space is sent to a cyber space and the environment of the physical space is reproduced in the cyber space has been proposed.

By utilizing the digital twin, it is expected to monitor the physical space and to implement a system in which the entire system is automatically cooperated based on real-time prediction in cyberspace. That is, based on the predictions in cyberspace, it is possible to predict and respond to changes in the real world.

Such a system can be effectively used for controlling the entire social system in real time and with a low environmental load such as controlling of cooperation in a smart factory where robots and persons cooperate, controlling of cooperation between automatically-operated railways and automobiles, controlling of power supply to moving objects (robots, mobility, and the like).

A 5G mobile communication system, referred to as 5G, is scheduled to start service in Japan from 2020. Network slicing and edge computing have attracted attention as 5G technologies. In the network slicing, virtual independent logical networks are multiplexed according to the applications on the same physical network architecture. In the edge computing, processing devices (mobile edge computing or multi-access edge computing (MEC) servers) are arranged to be distributed to locations (edges) physically close to users and terminals, and data processing is performed at edge points of the network.

In addition, as a calculation means, there are an artificial intelligence (AI) machine, an annealing machine, or the like which is configured with a deep neural network (DNN), a reservoir computer (reservoir computing) and the like. The reservoir computer is a type of a recurrent neural network (RNN), which is configured with three layers including an input layer, an intermediate layer (reservoir layer), and an output layer (readout neuron layer), and is learned by, for example, supervised learning. The annealing machine is a processing device that applies an Ising model or the like to solve an optimization problem.

As an example of network slicing, there is network slicing disclosed in JP-A 2020-136788. In addition, as an example of the annealing machine, there is a machine disclosed in JP-A2018-206127.

SUMMARY OF THE INVENTION

In order to connect the entire wide-area social system and a control the entire system without delay, it is necessary to operate data collection, data processing, and system control in real time.

For this reason, processing by artificial intelligence (AI) configured with a DNN, a reservoir computer, and the like or an annealing machine such as in JP-A 2018-206127 is proposed, but due to an increase in an amount of data and a demand for real-time processing, it is necessary to increase the processing capacity or enhance the functionality.

The present invention is to provide a data processing technique that can be adapted according to required data processing amount and processing content.

According to one aspect of the present invention, there is provided an information processing system including a parent device and a plurality of child devices. The child device constitutes at least a portion of at least one device selected from a function approximator and an annealing machine, each of the parent device and the plurality of child devices includes a communication interface, and the communication interface is at least one selected from a wireless communication interface and a wired communication interface including an analog circuit. Data to be processed by the child device is transmitted from the parent device to at least one of the plurality of child devices, and an output of at least one node of the child device is transmitted to at least one of the parent device and the other child devices.

Another aspect of the present invention is an information processing method executed by cooperation of a parent device and a plurality of child devices. The child device constitutes at least a portion of at least one device selected from a function approximator and an annealing machine. Each of the parent devices and the plurality of child devices include a communication interface. The communication interface is at least one selected from a wireless communication interface and a wired communication interface including an analog circuit. Data to be processed by the child device is transmitted from the parent device to at least one of the plurality of child devices. An output of at least one node of the child device is transmitted to at least one of the parent device and the other child devices.

It is possible to provide a data processing technology that can be adapted according to required data processing amount and processing content.

BRIEF DESCRIPTION OF THE DRAWINGS

FIG. 6B is an internal block diagram of the annealing machine of the fifth embodiment;

FIG. 6C is an operation time chart of the annealing machine of the fifth embodiment;

FIG. 8B is an internal block diagram of a reservoir of the seventh embodiment;

FIG. 8C is a table diagram illustrating functions shared by a server and the reservoir, data to be transmitted, and transmission destinations in the system according to the seventh embodiment;

FIG. 8D is an operation time chart of the reservoir of the seventh embodiment;

FIG. 9A is a block diagram illustrating a concept of a system that performs the same processing in a plurality of reservoirs of an eighth embodiment;

FIG. 9B is a table diagram illustrating functions shared by the server and the reservoir, data to be transmitted, and transmission destinations in the system of the eighth embodiment;

FIG. 10B is a table diagram illustrating functions shared by the server and the reservoir, data to be transmitted, and transmission destination in the system of the ninth embodiment;

FIG. 11 is a conceptual diagram illustrating an example in which a plurality of data are simultaneously processed in real time by a prediction planning unit of a twelfth embodiment;

FIG. 14 is a block diagram illustrating a concept of stepwise composite AI; and FIG. 15 is a block diagram illustrating a concept of parallel implementation of current state analysis and future prediction.

DESCRIPTION OF EMBODIMENTS

Figure 1:
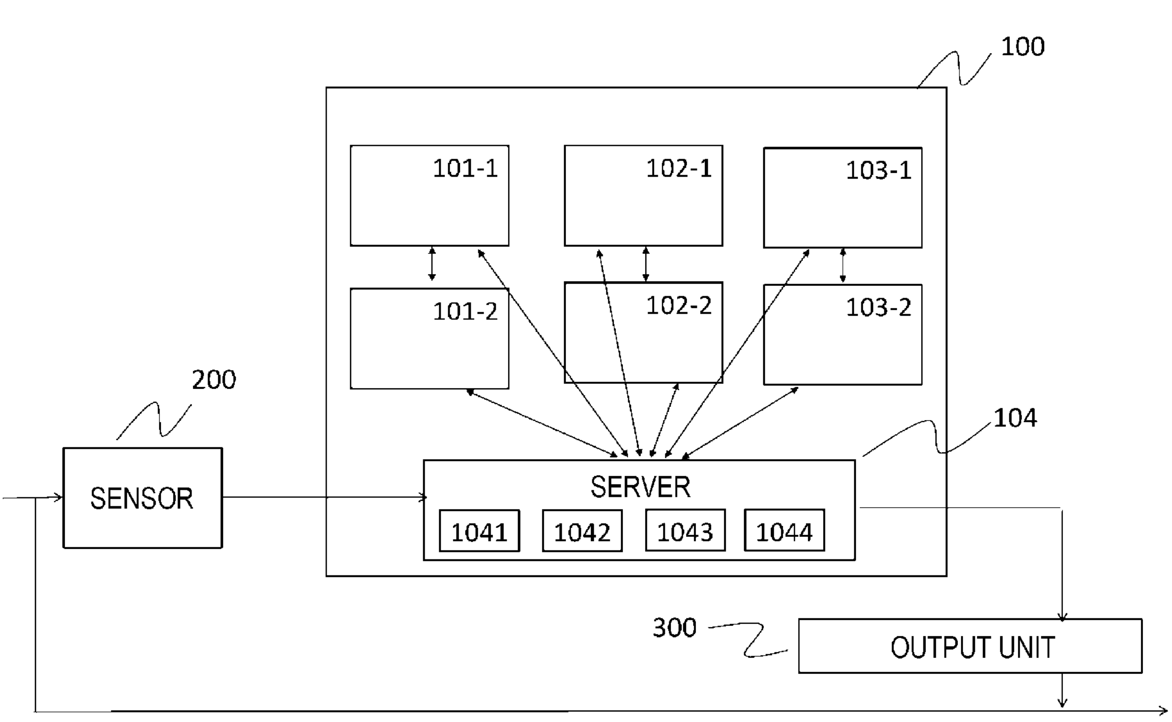
FIG. 1 is a block diagram illustrating a basic configuration of an information processing system according to a first embodiment.

Hereinafter, embodiments will be described in detail with reference to the drawings. However, the present invention is not construed as being limited to the description of the embodiments illustrated below. It is easily understood by those skilled in the art that a specific configuration thereof can be changed without departing from the idea or spirit of the present invention.

In the configuration of the invention described below, the same components or components having similar functions are denoted by the same reference numeral, which may be used in common among different figures, and duplicate description may be omitted.

In a case where there are a plurality of elements having the same or similar functions, different subscripts maybe attached to the same reference numeral in the description. However, in a case where it is not necessary to distinguish between the plurality of elements, the subscripts may be omitted in the description.

The notations such as "first", "second", and "third" in this specification and the like are attached to identify components and do not necessarily limit the number, order, or contents of the components. In addition, reference numerals for identifying components are used for each context, and reference numerals used in one context do not always indicate the same configuration in the other contexts. In addition, such numbering does not prevent the component identified by a certain reference numeral from having the function of the component identified by another reference numeral.

In some cases, the position, size, shape, range, and the like of each configuration illustrated in the drawings and the like may not represent actual position, size, shape, range, and the like in order to facilitate understanding of the invention. For this reason, the present invention is not necessarily limited to the position, size, shape, range, and the like disclosed in the drawings and the like.

The publications, patents, and patent applications cited in this specification constitute a portion of the description of this specification.

First Embodiment

<Basic Configuration of Information Processing System>

FIG. 1 is a block diagram illustrating a basic configuration of the information processing system according to the first embodiment. The system includes a prediction planning unit 100, a sensor 200, and an output unit 300.

The prediction planning unit 100 includes a deep neural network (DNN) 101, a reservoir 102, an annealing machine 103, and a server 104. The prediction planning unit 100 receives data from the sensor 200 as an input and outputs calculation results to the output unit 300. The calculation results of the prediction planning unit 100 are sent to the output unit 300 by, for example, wireless communication. The calculation results of the prediction planning unit 100 are, for example, recognition, understanding, determination, prediction, or action planning (these may be collectively referred to as inference, and the processing and output of the DNN 101, the reservoir 102, and the annealing machine 103 are also referred to as inference).

The sensor 200 collects data in physical space such as a position and movement of a person, a state of a machine or a robot, or a state of transportation or environment with a known sensor device or camera and sends the data by, for example, wireless communication to the prediction planning unit 100. The sensor 200 is assumed to detect various states such as position, acceleration, sound, temperature, vibration, odor, and image.

The output unit 300 is, for example, an interface or a display for controlling an actuator. The actuator is a mechanical element constituting mechanical and electrical circuits that convert input energy or an electrical signal into a physical motion. The actuator is controlled by the calculation results, for example, action planning results of the prediction planning unit 100. The display displays the calculation results, for example, the action planning results or the prediction results so that the person can recognize the results.

The prediction planning unit 100 includes a server 104 as a parent device and a plurality of child devices (at least one selected from the DNN 101, the reservoir 102, and the annealing machine 103). The prediction planning unit 100 performs calculation for prediction and action planning in cooperation with each other by wireless or wired communication between the parent device and the child device and further by communication between the child devices and controls the actuator based on the calculation result or displays the result on the display.

In this embodiment, since the child device is assumed to be configured with independent terminals, in a case of applying a wired connection between the child devices, it is necessary to provide, for example, a transceiver (transmission/receiving circuit) for long-distance transmission instead of a bus connection within a semiconductor chip or between the chips. That is, in the transceiver for long-distance transmission, in order to compensate for attenuation and deterioration of a signal waveform due to long-distance transmission, a transmitting circuit is necessarily provided with a transmission amplifier (analog circuit), and a receiving circuit is necessarily provided with a reception amplifier (analog circuit), an equalizer (waveform equalization circuit), a synchronization circuit, and the like.

In FIG. 1, two DNNs 101, two reservoirs 102, and two annealing machines 103 are arranged, but the number is arbitrary and may be three or more each. This also applies to the following embodiments, and the number of child devices can be freely set as needed. By the cooperation between the child devices, it is possible to perform calculation with a desired scale.

The server 104 includes an input device 1041, an output device 1042, a processing device 1043, and a storage device 1044 as a known server configuration. In this embodiment, functions of calculation, control, and the like by the server 104 are implemented by executing the program stored in the storage device 1044 by the processing device 1043 to implement predetermined processing by cooperating with other hardware. A program executed by a server, a function of the program, or a means for implementing the function may be referred to as a "function", a "means", a "portion", a "unit", a "module", or the like.

The above-described configuration may be configured with a single server, or an arbitrary portion of the input device 1041, the output device 1042, the processing device 1043, and the storage device 1044 may be configured with another computer connected via a network.

In this embodiment, functions equivalent to the functions configured by software can be implemented by hardware such as a field programmable gate array (FPGA) and an application specific integrated circuit (ASIC).

According to this embodiment, it is possible to implement dynamic optimum control of a large-scale system and create a high sense of presence. The above-described configuration is a typical example. The server may be a general computer or an MEC server. The sensor 200 can be provided on the server 104 or the terminal side.

Second Embodiment

<Cooperation System of Child Devices>

Figures 2, 3:
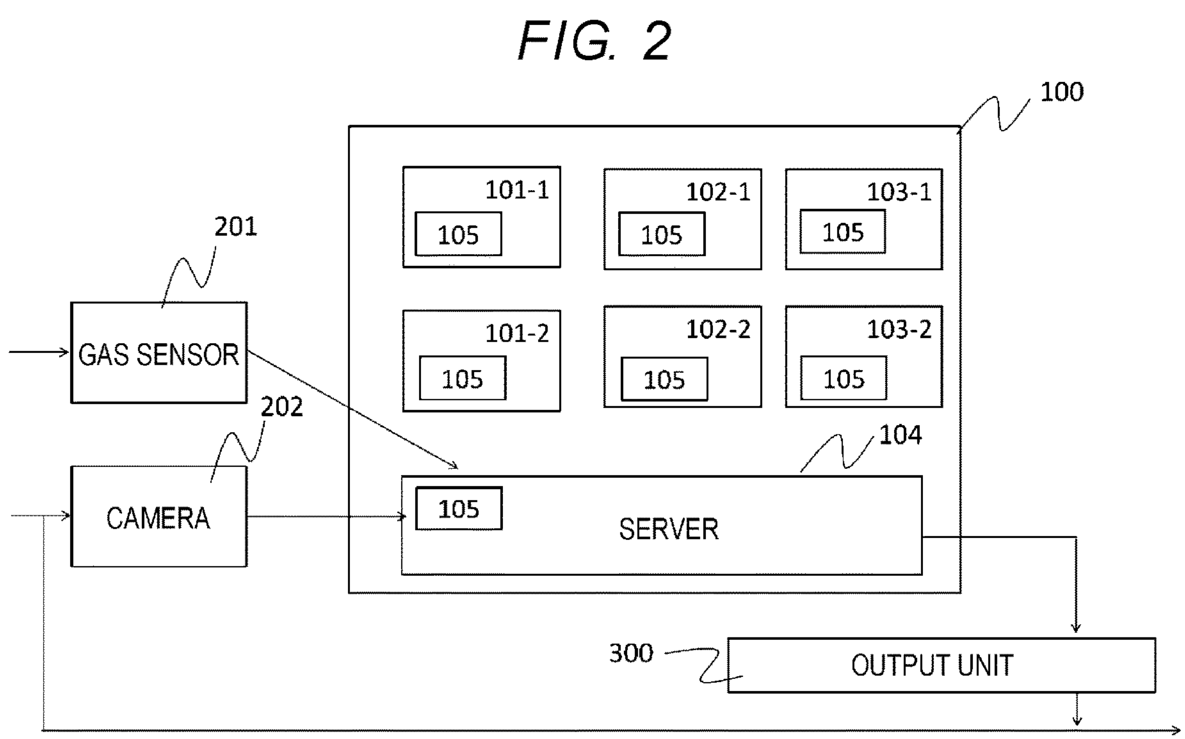
FIG. 2 is a block diagram illustrating an overall configuration of an information processing system according to a second embodiment.
FIG. 3 is a table diagram illustrating a list of processing patterns possible in the information processing system according to the second embodiment.

FIG. 2 is a block diagram illustrating an overall configuration of an information processing system according to a second embodiment. In this embodiment, as sensors, for example, an environmental sensor such as a gas sensor 201 and a camera 202 that images a state of a person or a device are provided. The data from the gas sensor 201 and the image data from the camera 202 are aggregated on the server 104 by wire or wirelessly. Here, an MEC server may be used as the server.

Each of the DNN 101, the reservoir 102, the annealing machine 103, and the server 104 has a wireless interface 105, and thus, data can be transmitted and received to and from each other. In this embodiment, the hardware configurations of the DNN 101, the reservoir 102, and the annealing machine 103 have the same standard.

The deep learning is a technology that learns a neural network (DNN or the like) configured with an input layer, a hidden layer, and an output layer and configures a function approximator so as to output an arbitrary vector f(x) with respect to an input vector x. That is, the output is expressed as f1=f1(x1, x2, x3), f2=f2(x1, x2, x3). In this embodiment, the input layer and the output layer are realized by the server 104, and the hidden layer is configured with the DNN 101. Strictly speaking, the DNN 101 corresponds to the hidden layer that is a portion of the deep neural network, but in this specification, the name DNN is used for convenience. The DNN 101 can be learned by, for example, supervised learning. In this embodiment, the DNN 101 is assumed to be learned by a known technique so that an arbitrary feature amount can be extracted from the data from the gas sensor 201 and the image data from the camera 202. When the input to the DNN 101 is a time-series data, an output from the DNN 101 is also a time-series feature amount data.

Reservoir computing is a technology that can perform the supervised learning and constitutes the function approximator, which is configured with three types of layers of an input layer, an intermediate layer (reservoir layer), and an output layer (read-out neuron layer). In this embodiment, the input layer and the output layer are realized by the server 104, and the reservoir layer is configured with the reservoir 102. The output layer is assumed to be learned by a known technique. The reservoir 102 performs tasks (prediction and feature extraction for time-series signals) for the time-series signals. That is, the output value at the current discrete time nT is a function of values of x1, x2, x3 of the current time nT and the past discrete-time (n−1) T, (n−2) T, . . . . That is, the output of the output layer of the reservoir computing is expressed as:

f1 (nT)=f1 (x1 (nT), x2 (nT), x3 (nT), x1 ((n−1) T), x2 ((n−1) T), x3 ((n−1) T)), x1 ((n−2) T), x2 ((n−2) T), x3 ((n−2) T), . . . .)

f2 (nT)=f2 (x1 (nT), x2 (nT), x3 (nT), x1 ((n−1) T), x2 ((n−1) T), x3 ((n−1) T)), x1 ((n−2) T), x2 ((n−2) T), x3 ((n−2) T), . . . .)

The reservoir computing has characteristics of being easier to learn tasks for time-series signals than the deep learning. Specifically, the former only needs to learn the weights of the neurons in the output layer. In contrast, the latter (deep learning) requires learning the weights of the neurons in all layers. In the case of the DNN such as a recurrent neural network (RNN) and a long short-term memory (LSTM) that process time-series signal tasks, learning is performed by a method called a backpropagation through time (BPTT), but as described above, the learning is not easy because it is necessary to learn all the layers of neurons corresponding to each time zone. Therefore, in one aspect of this embodiment, after the feature amount such as the shape and position of the person and the gas component is extracted by the DNN 101, the reservoir 102 performs prediction from a time-dependent change of the feature amount.

The annealing machine 103 is a device that performs optimization calculation, and the basic configuration of the annealing machine 103 is disclosed in, for example, JP-A 2018-206127. The annealing machine 103 solves the optimization problem by implementing an interaction between the spins inside a spin array configured with a plurality of nodes storing binary spins and transitioning to a state of minimum or maximum energy. It is noted that the spin value can be expanded to three or more values.

In this embodiment, for example, the following processing patterns are assumed. It is assumed that the processing will be performed in real time. Specific application examples include, for example, prediction and optimization of a flow of persons in a predetermined section. In this case, the sensor 200 is a camera or a vibration sensor and acquires image data and vibration data of pedestrians. The DNN 101 detects a feature amount such as a position of each person, a direction in which each person faces, a posture, a speed, and the like from the data of the sensor. The reservoir 102 predicts a future data and a feature amount. The annealing machine 103 calculates a planned value of, for example, opening/closing of an entrance and a speed of an elevator from the current or future feature amount and performs optimization such as equalization of the flow of persons.

FIG. 3 is a table diagram illustrating an example of processing patterns possible in the information processing system of FIG. 2.

Pattern 1: The time-series data from the sensor 200 is sent to the server 104. The time-series data is transmitted from the server 104 to the DNN 101, and the time-series feature amount are extracted. The time-series feature amount are sent from the DNN 101 to the reservoir 102 via the server 104. The reservoir 102 predicts a future feature amount from time-series feature amount and sends the future feature amount to the server 104. The server 104 generates an optimization problem based on the future feature amount, converts the optimization problem into the Ising model that can be processed by the annealing machine 103, and sets the problem in the annealing machine 103. After solving the problem with the annealing machine 103, the server 104 reads out a solution and outputs the solution to the output unit 300 as, for example, the action planning.

Pattern 2: The time-series data from the sensor 200 is sent to the server 104. The time-series data is sent from the server 104 to the DNN 101. The DNN 101 extracts a time-series feature amount from the time-series data and sends the time-series feature amount to the server 104. The server 104 generates an optimization problem based on the feature amount, converts the optimization problem into the Ising model that can be processed by the annealing machine 103, and sets the problem in the annealing machine 103. After solving the problem with the annealing machine 103, the server 104 reads out a solution and outputs the solution to the output unit 300 as, for example, the action planning.

Pattern 3: The time-series data from the sensor 200 is sent to the server 104. The time-series data is sent from the server 104 to the reservoir 102. The reservoir 102 predicts a future data or a feature amount from the time-series data and sends the future data or the feature amount to the server 104. The server 104 generates an optimization problem based on the future data or the feature amount, converts the optimization problem into the Ising model that can be processed by the annealing machine 103, and sets the problem in the annealing machine 103. After solving the problem with the annealing machine 103, the server 104 reads out a solution and outputs the solution to the output unit 300 as, for example, the action planning.

Pattern 4: The time-series data from the sensor 200 is sent to the server 104. The time-series data is sent from the server 104 to the DNN 101. The DNN 101 extracts a time-series feature amount from the time-series data and sends the time-series feature amount to the reservoir 102 via the server 104. The reservoir 102 predicts a future feature amount from the time-series feature amount and sends the future feature amount to the server 104. The server 104 outputs the future feature amount as a predicted value to the output unit 300.

Pattern 5: The time-series data from the sensor 200 is sent to the server 104. The time-series data is sent from the server 104 to the reservoir 102. The reservoir 102 predicts a future data from the time-series data and sends the future data to the server 104. The server 104 outputs the future data as a predicted value to the output unit 300.

Pattern 6: The time-series data from the sensor 200 is sent to the server 104. The server 104 generates an optimization problem based on the time-series data, converts the optimization problem into the Ising model that can be processed by the annealing machine 103, and sets the problem in the annealing machine 103. After solving the problem with the annealing machine 103, the server 104 reads out a solution and outputs the solution to the output unit 300 as, for example, the action planning.

In this embodiment, the server 104 and the child devices 101 to 103 are provided with a wireless interface 105, and thus, data can be transmitted and received to and from each other. In particular, the functions of the DNN 101, the reservoir 102, and the annealing machine 103 can be flexibly set by transmitting and receiving the outputs of the nodes of the child devices between the child devices. Here, the neurons of the DNN 101 and the reservoir 102 and the spins of the annealing machine 103 are collectively referred to as nodes.

A compressed data is transmitted between the child devices, and the wireless interface 105 of each child device is provided with a compression/decompression unit. The server 104 guarantees synchronization of operations between the child devices by broadcasting a synchronization signal to each child device or by providing each child device with an atomic clock. Details of the communication means between the server 104 and the child devices will be described in detail in later embodiments.

Third Embodiment

<Implementation Example of Child Device>

Figure 4:
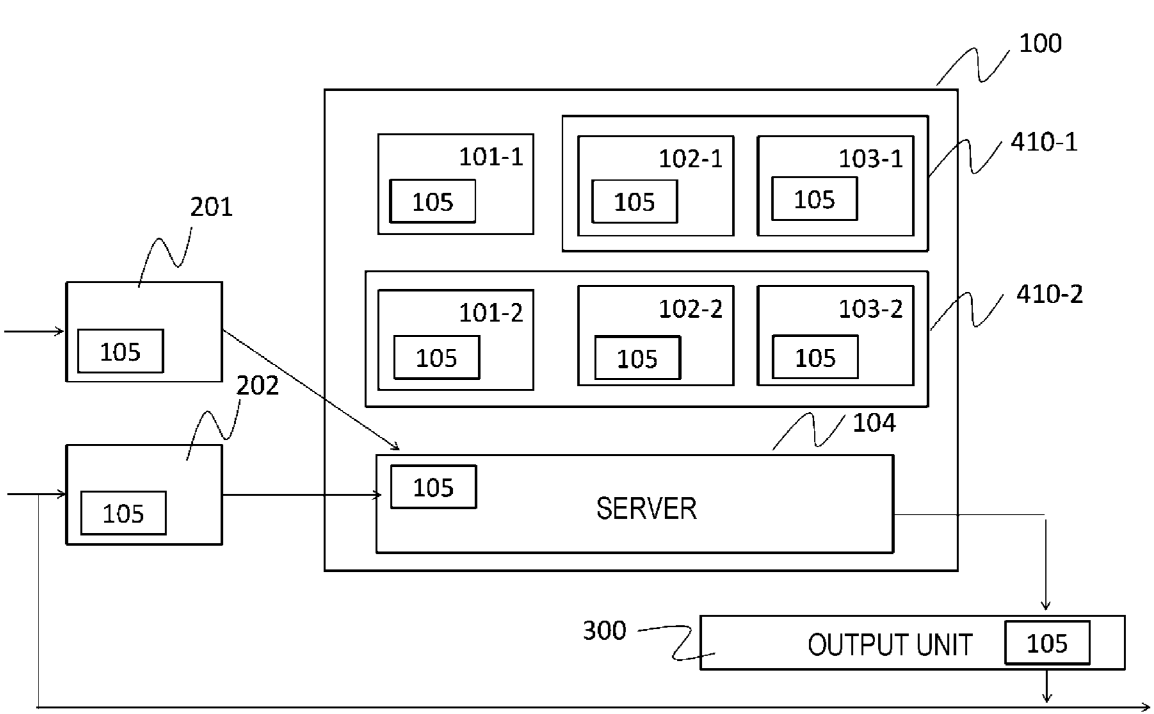
FIG. 4 is a block diagram illustrating an example of circuit implementation of an information processing system according to a third embodiment.

FIG. 4 is a block diagram illustrating an example of circuit implementation of the information processing system. In FIG. 2, each of the DNN 101, the reservoir 102, and the annealing machine 103 is illustrated as an independent child device. However, a plurality of the components may be configured on the same child device. That is, any plurality of the components selected from, for example, the DNN 101-1, the reservoir 102-1 and the annealing machine 103-1 can be provided as a set on the same child device 410.

For this reason, the child device 410 is a reconfigurable circuit on a large scale integrated circuit (LSI) or a field programmable gate array (FPGA) and may be implemented with at least two or more functions among the DNN 101-1, the reservoir 102-1, and the annealing machine 103-1. Accordingly, since one child device can dynamically switch functions to sequentially perform the functions, the number of child devices can be reduced. Alternatively, the DNN 101, the reservoir 102, and the annealing machine 103 can be implemented by software. In this case, the software is executed by a general-purpose or a dedicated processor.

In this embodiment, the gas sensor 201, the camera 202, the output unit 300, the server 104, and the child device are provided with the wireless interface 105, and data is transmitted and received wirelessly. A plurality of antennas (or a plurality of wireless transceivers) are connected to the wireless interface 105. In one example, the plurality of antennas can wirelessly communicate in parallel in a plurality of frequency bands. Furthermore, the server 104 has a known spectrum sense function and determines the communication frequency so as to avoid mutual interference.

Fourth Embodiment

<Example of Feature Extraction on Sensor Side>

Figure 5:
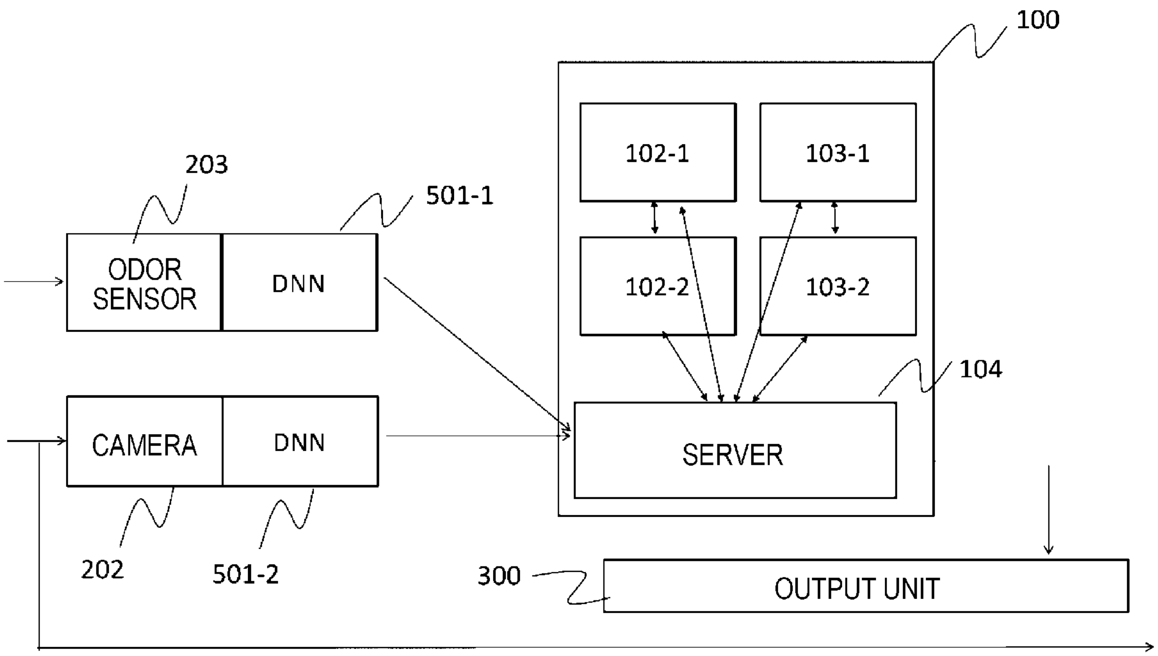
FIG. 5 is a block diagram illustrating a configuration example of feature extraction according to a fourth embodiment.

FIG. 5 is a block diagram illustrating another example of the configuration of feature extraction. In FIG. 2, the DNN 101 is configured with a child device that wirelessly communicates with the server 104, but the feature extraction may be performed on the sensor side. In FIG. 5, a DNN 501 is arranged to be attached to the camera 202 and an odor sensor 203.

By performing the feature extraction by the deep learning on the sensor 200 side in this manner, the amount of data transmitted from the sensor can be reduced.

Fifth Embodiment

<Peer-To-Peer Connection Annealing Machine>

Figure 6A:
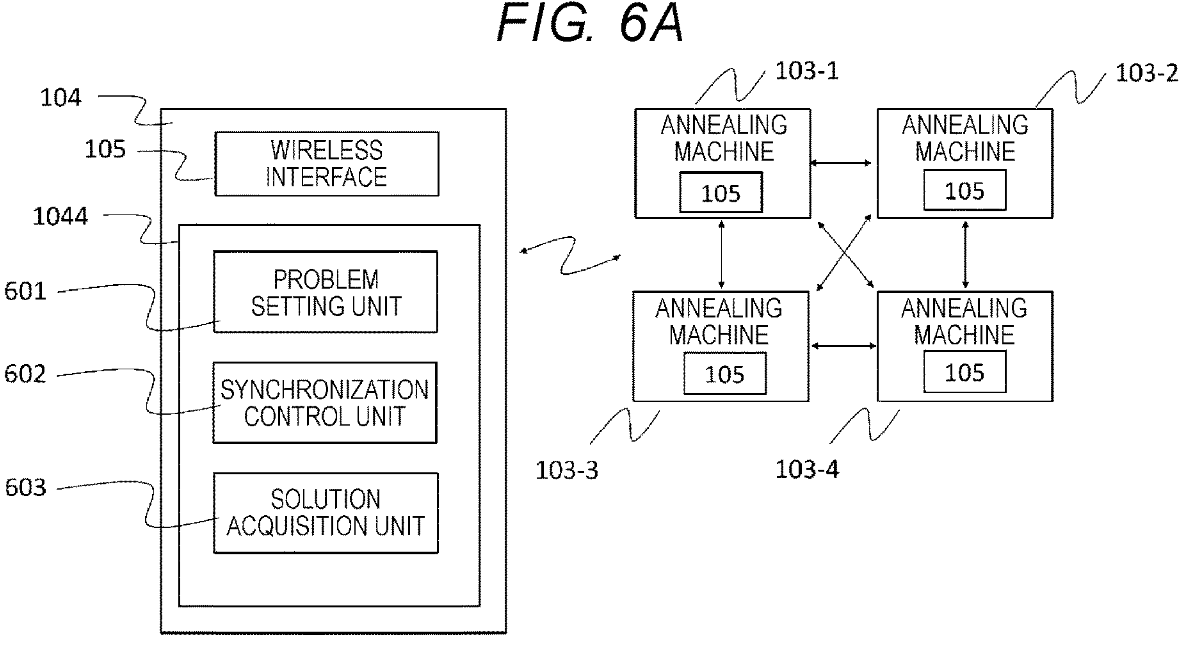
FIG. 6A is a block diagram illustrating a concept of a system in which a plurality of annealing machines of a fifth embodiment cooperate to perform processing.

FIG. 6A is a block diagram illustrating a concept of a system in which a plurality of annealing machines 103-1 to 103-4 cooperate to perform processing. In this example, the annealing machines 103-1 to 103-4 and the server 104, which are connected in a peer-to-peer manner, are wirelessly connected to each other as in FIG. 4A.

A problem setting unit 601 which is a program stored in the storage device 1044 of the server 104 sets an optimization problem based on the feature amount extracted by the DNN 101 or the reservoir 102 or the predicted value from the reservoir 102. An interface that allows a user to input maybe provided for the problem setting. In addition, the problem setting unit 601 may set the problem by deep learning. In that case, the deep neural network is provided as hardware.

The problem setting unit 601 converts the optimization problem into the Ising model and determines an external magnetic field coefficient defining the interaction between the spins as known in JP-A 2018-206127 and the like, an interaction coefficient, and the like. When performing problem setting by using deep learning, by inputting the feature amount extracted by the DNN 101 or the reservoir 102, the predicted value from the reservoir 102, the sensor output, the processed signal of the sensor output, and the like to the deep neural network, a set of the coefficients is obtained from the output. Parameters of the deep neural network (neuron weights and the like) may be learned and set in advance on the server 104. In addition, on the server 104, learning and setting may be performed at any time or at an appropriate timing. Alternatively, it may be learned and set in advance, at any time, or at an appropriate timing on a computer outside the server 104 or on a cloud. A coefficient determined by the problem setting unit 601 is transmitted from the wireless interface 105 of the server 104 to the annealing machines 103-1 to 103-4. The annealing machines 103-1 to 103-4 set the received coefficients, perform the interaction calculation by a known method, and update the spin values.

In the peer-to-peer connection, the annealing machines 103-1 to 103-4 operate as one annealing machine as a whole. The annealing machine uses the value of a spin (referred to as an adjacent spin) connected to the spin in order to update one spin value. Therefore, for example, in a case where the annealing machine 103-2 has an adjacent spin for updating the spin of the annealing machine 103-1, the value of the spin is wirelessly transmitted from the annealing machine 103-2 to the annealing machine 103-1.

Figures 6B, 6C:
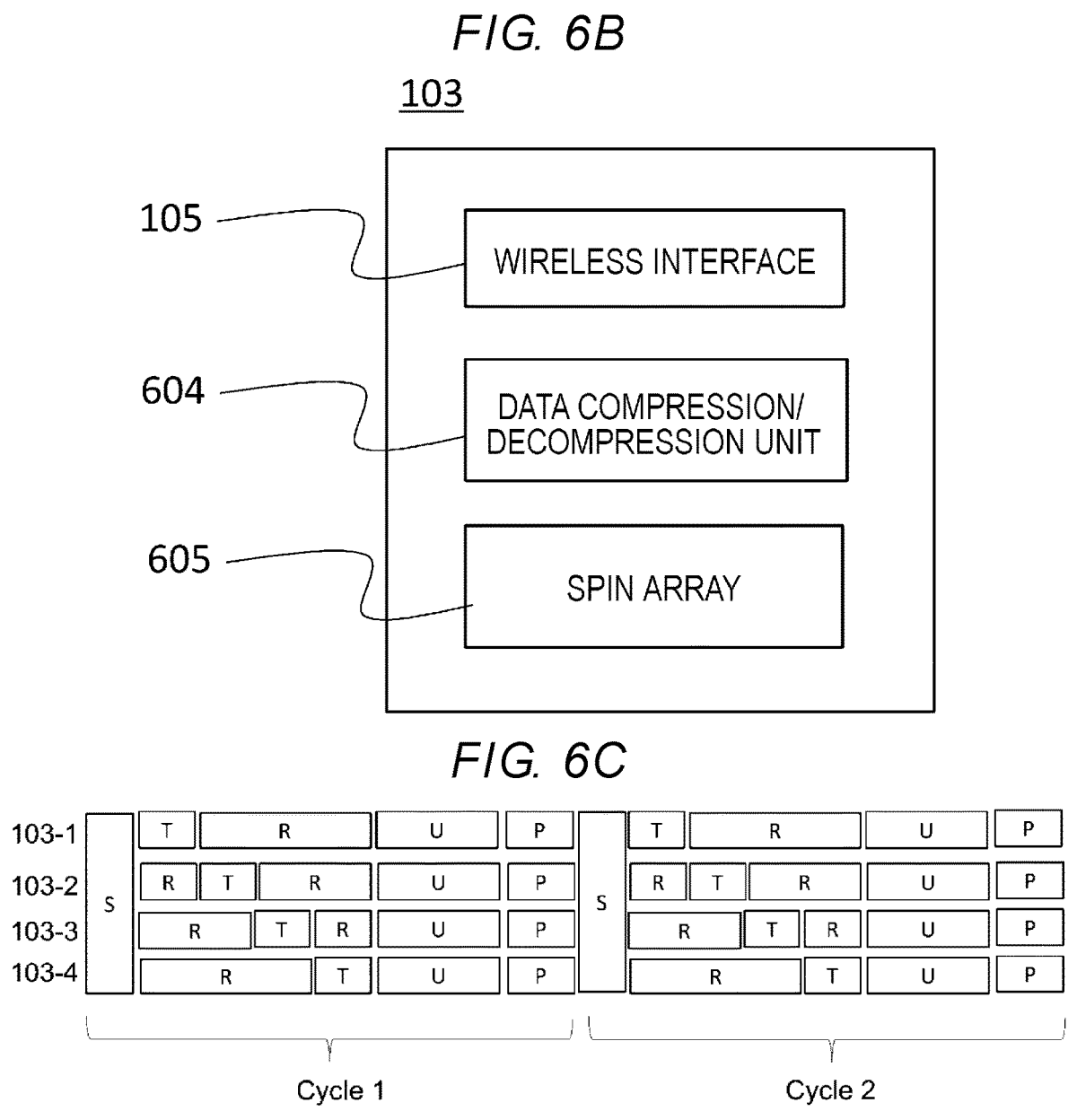

FIG. 6B illustrates a detailed internal block diagram of the annealing machine 103. The wireless interface 105 performs transmission and reception of data. A data compression/decompression unit 604 compresses the data to be transmitted and decompresses the received data. A spin array 605 has a configuration for transitioning a spin known in JP-A 2018-206127 or the like to a ground state and is implemented by applying, for example, the principle of a semiconductor memory.

FIG. 6C is an operation time chart of the annealing machines 103-1 to 103-4 of FIGS. 6A and 6B. It is assumed that the coefficient is set in advance from the problem setting unit 601 to each of the annealing machines 103-1 to 103-4 via the wireless interface 105, and the spin value of the spin array 605 is, for example, randomly initialized.

First, in order to synchronize the annealing machines 103-1 to 103-4, the synchronization signal (S) is broadcast-transmitted to each of the annealing machines 103 from a synchronization control unit 602 of the server 104. Each annealing machine 103 includes a synchronization signal receiving circuit and a counter, resets the counter to zero at the timing of receiving the synchronization signal, after that, increases the value of the counter by an internal clock, and switches each operation based on the value of the counter. Accordingly, even though the internal clock frequencies of the annealing machines are slightly different, these internal operations can be synchronized with each other.

Next, although the order is arbitrary, for example, the annealing machine 103-1 performs a transmission process (T) for transmitting the spin value of the annealing machine 103-1 to the annealing machines 103-2 to 103-4, and the annealing machines 103-2 to 103-4 performs reception processes (R) of the spin value. In the first transmission (Cycle 1), the initial value (usually random) of the spin is transmitted. Although all of the spin values of the annealing machine may be transmitted, it is efficient to transmit only the spin values that are adjacent spins for the spins of other annealing machines. The server 104 notifies each annealing machine 103 of the arrangement relationship of the adjacent spins in advance. After that, each annealing machine 103 sequentially alternates between transmission and reception roles. In addition, as described later, the compression process of a transmission data is performed by the data compression/decompression unit 604.

It is noted that, with respect to each annealing machine 103, which is a child device, a time stamp is attached to the transmission data. The same applies to the other embodiments below.

After the transmission/reception is completed, the spin array 605 of each annealing machine 103 performs the interaction calculation by a known method, and performs an update process (U) for the spin value. Next, the updated spin value is transmitted to another annealing machine 103, and in order to compress an amount of transmission data, the data compression/decompression unit 604 performs a compression process (P). In the compression process (P), only the difference from the previous time is transmitted.

After that, the same synchronization processing (S), data transmission/reception (T) (R), spin update (U), and data compression (P) are executed until the spin value converges after Cycle 2 or a specified number of times, and each annealing machine 103 transmits the final spin value to the server 104. A solution acquisition unit 603 of the server 104 obtains a solution based on the collected spin values and outputs the solution to the output unit 300.

In the annealing machine, in each of the above-described time-division broadcasts, in order to finish the broadcast in a short time and shorten the calculation time, the data may be divided and transmitted in parallel by using a plurality of frequency channels. The server 104 is assumed to select and instruct the frequency channel.

In the case of using the plurality of frequency channels, a plurality of antennas and a plurality of transceivers are prepared in the wireless interface 105. In an implementation, only the plurality of antennas may be used, and the transceiver may be commonly used. In that case, a plurality of transmission/receiving circuits are provided in parallel in the transceiver, and transmission/reception is performed in parallel. In order to monitor an empty frequency band, the server 104 may perform spectrum sensing, grasp the empty frequency region in units of a channel, and allocate the empty frequency region to each child device as the channel at the time of broadcasting.

In addition, since each child device is provided with the plurality of antennas and the plurality of receiving circuits, it is possible for each child device to perform broadcast all at once (simultaneously) by frequency-division instead of time division. For example, in FIG. 6A, when each child device uses four antennas and four frequency bands to receive with three antennas and three receivers connected to the three antennas and each child device performs transmission with one antenna and a transmitter connected to the one antenna, it is possible to perform broadcast all at once. In this case, the communication time can be reduced to ¼.

Similarly, each child device is provided with the plurality of antennas and the plurality of transceivers, and each child device performs transmission and reception by code-division multiplexing, so that it is possible to perform broadcast to each other all at once. In that case, interference can be prevented while sharing the frequency band by multiplying a predetermined spread code in each transceiver. The server 104 is assumed to select and instruct the spread code.

In the system of this embodiment, since the time for broadcasting the spin information is larger than that for the spin update calculation of the annealing machine 103, it is important to shorten the data transmission/reception time between the annealing machines 103. For this reason, it is preferable to speed up transmission such as frequency-division multiplexing and to compress spin information before the transmission.

As one of the means of compression, only the updated spin information as described above is transmitted. For this reason, it is preferable that updated maps of the spins are generated. In particular, as the calculation progresses, the number of updated spins decreases, and thus, most of the updated maps are zero (without updates), and a few of the updated maps are 1 (with updates). Since there are many zeros, the compression can be performed at a high compression rate even with a reversible compression method. As another method, by performing spatial frequency conversion such as discrete cosine transform or Fourier transform on the spin information map, low frequency components and high frequency components are separated, and the low frequency components with a high importance is finely quantized with a high number of bits, and the high-frequency components with a low importance (or with a low number of components) can be coarsely quantized with a low number of bits, so that the compression rate is increased.

In the compression process (P) of the data compression/decompression unit 604, it is desirable to perform irreversible compression of the transmission data in addition to or instead of using the update presence/absence and difference from the previous state as the transmission data as described above. Since the spin value of the spin array is a two-dimensional arrangement of 1 or −1 (0), this arrangement can be regarded as a monochrome image. Alternatively, information on the plurality of spins can be regarded as a color image. In the latter, for example, information (24-bit information) of 6×4 (=24) spins can be regarded as one pixel of an 8-bit (R) 8-bit (G) 8-bit (B) color image.

By applying a data compression technique such as JPEG which is known as an image compression technique, it is possible to irreversibly compress such a set of spin data regarded as a monochrome or color two-dimensional image. Since irreversible compression of JPEG or the like has a high compression rate, the transmission data between the child devices can be reduced, and the transmission time can be shortened. The data compression/decompression unit 604 of the annealing machine 103 performs irreversible image compression and irreversible image decompression. The second annealing machine 103-2 receives the spin information compressed and transmitted from the first annealing machine 103-1 by the irreversible image compression method, decompresses the irreversible image, and restores the spin information.

Due to the irreversible compression, the restored spin information is not exactly the same as the original spin information. However, since the annealing machine 103 stochastically updates the spin and is resistant to random errors, the annealing machine 103 is resistant to the above-described spin information error. Since it is better that the error occurs randomly, it is possible to have several methods of irreversible compression and apply the methods of irreversible compression randomly or sequentially.

In addition, the compression rate may be increased by applying a smoothing filter process and the like to allow the equivalent image related to the spin information to be monotonous. In addition, as described above, the process of extracting only the difference data from the previous state may be performed. Such a filter and a processing function can be provided as a portion of the data compression/decompression unit 604 or can be provided to a pre-stage of the data compression/decompression unit 604. A portion of the data is lost even with a smoothing filter or frequency conversion, but in the case of the annealing machine, it is considered that there is no significant effect on the calculation results.

As described above, various combinations of (with/without generation of update information and difference information)×(with/without compression) can be realized for data reduction for shortening the transmission time. In addition, since it is considered that the transmission time is longer than the time for the data reduction process, various data reduction methods may be executed in serial or in parallel to select a preferable result.

In a case where the above-described embodiment is an example of an annealing machine, but it is known that the reservoir computers are roughly classified into two types of an echo state network (ESN) and a liquid state machine (LSM). In the ESN, since the neuron output is a continuous value, the neuron output is represented by, for example, 32 bits. On the other hand, in the LSM, since the neuron output is a spike signal, the neuron output is represented by two or three values such as 0 and 1 or −1, 0, and 1. In the latter, since the output of neurons other than the neurons that generate the spike is 0, the neuron output information can be compressed at a high compression rate without being converted into update information or difference information, so that the transmission data can be reduced. In addition, in the case of the ESN, since the data reduction effect due to the difference is small, similarly, it is preferable to compress the neuron output information without converting the neuron output information into the difference information.

It is noted that, in the case of the reservoir computer, since each neuron is connected not only to nearby neurons but also to distant neurons, broadcasting is suitable for the transmission of the neuron output information from the reservoir 102. On the other hand, in the case of the annealing machine, each spin is often required to be only connected to adjacent spins, and in this case, the output may be transmitted between specific spins.

Figure 6D:
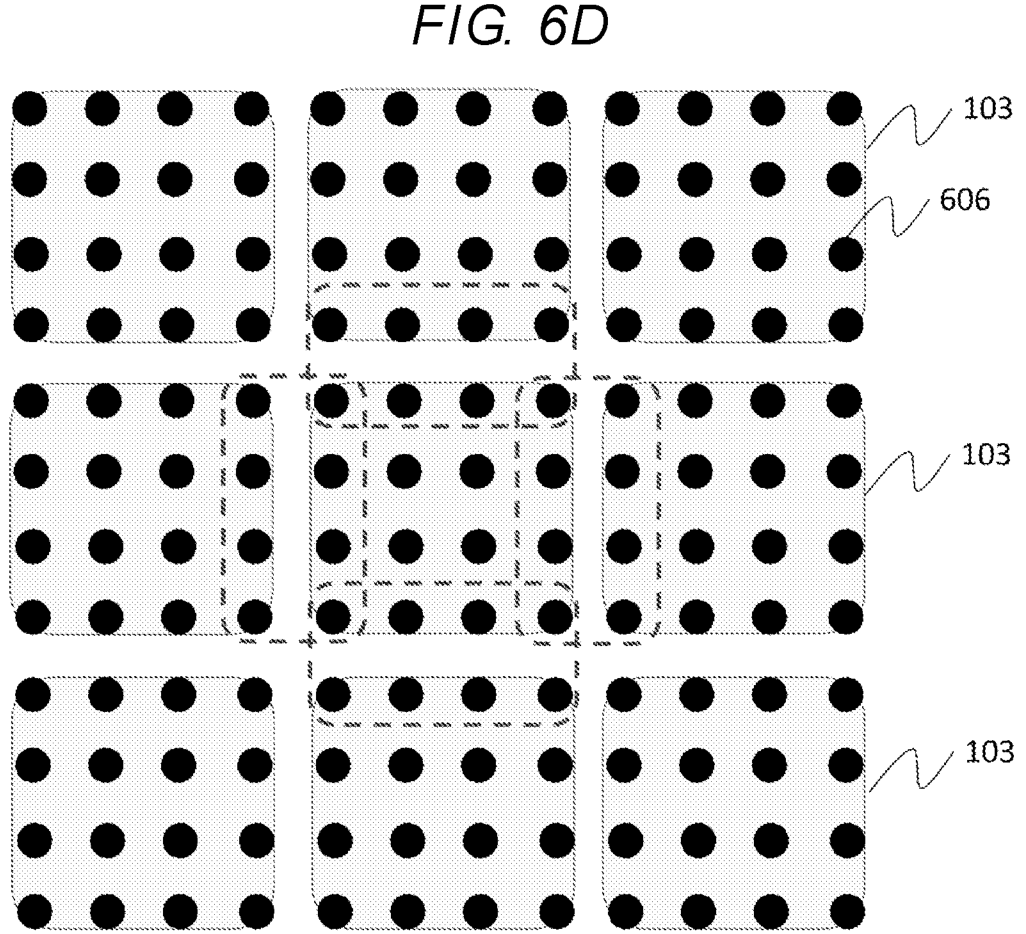
FIG. 6D is a conceptual diagram illustrating a concept of connecting adjacent spins of the annealing machine of the fifth embodiment.

FIG. 6D is a conceptual diagram illustrating the concept of connecting adjacent spins of the annealing machine. In this conceptual diagram, nine annealing machines 103 are arranged two-dimensionally, and 16 spins 606 are arranged in each annealing machine (actually, the number may be larger, and there are cases where the annealing machines are arranged three-dimensionally). In the case of the annealing machine, only the coupling between the adjacent spins may be preferable. In that case, as illustrated in FIG. 6D, the central annealing machine only needs to exchange information on the spin 606 existing at the boundary indicated by the dotted frame with each adjacent annealing machine. For this reason, for example, each annealing machine may perform transmission and reception in four directions at the same time by frequency-division multiplexing, code-division multiplexing, or space-division multiplexing by using four transceivers in parallel as the wireless interface 105 (or providing one transceiver with a plurality of antennas). For the compression of the spin information, irreversible compression with a high compression rate can be used, but in the above-described case, since the transmission amount is small, reversible compression without information deterioration may be used.

In the above-described embodiment, a large-scale problem can be coped with by combining small-scale annealing machines and transmitting and receiving adjacent spin data between the annealing machines. In addition, it is possible to solve large-scale problems with low power consumption child devices that cope with battery drive and self-power generation.

Sixth Embodiment

<Star Connection Annealing Machine>

Figure 7:
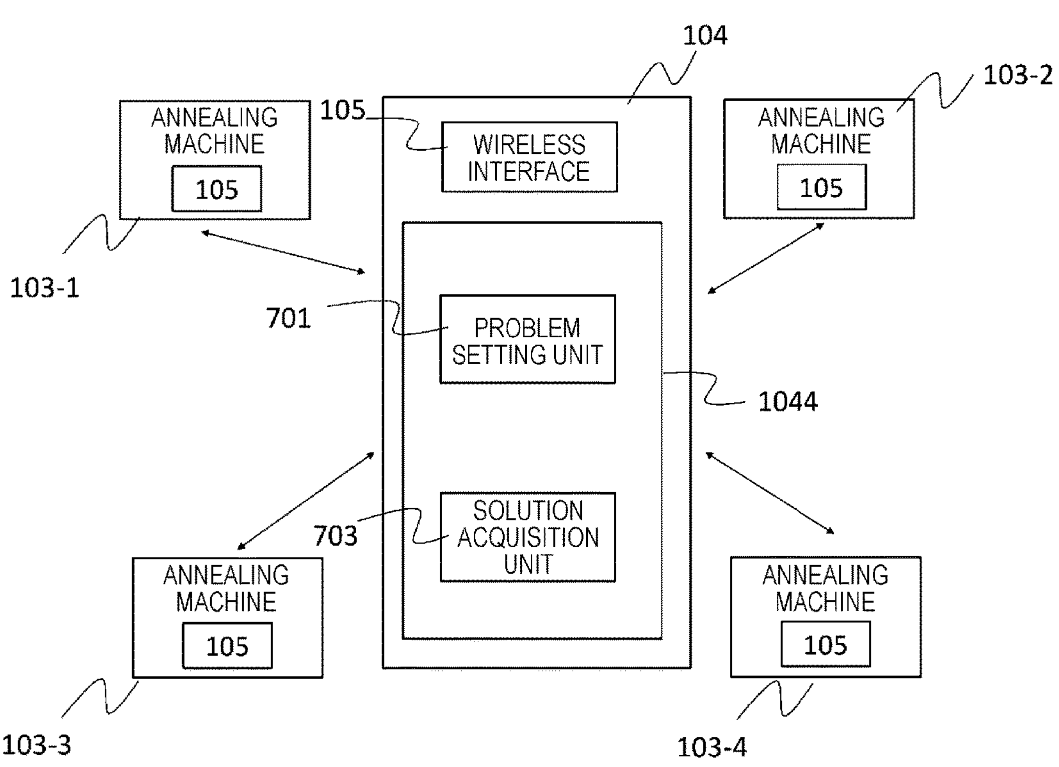
FIG. 7 is a block diagram illustrating a concept of a system for solving the same problem with a plurality of annealing machines of a sixth embodiment.

FIG. 7 is an example different from the fifth embodiment, in which the same problem is solved by the plurality of annealing machines 103-1 to 103-4. The plurality of annealing machines 103-1 to 103-4 perform calculations independently.

A problem setting unit 701 of the server 104 transmits coefficients for the same problem to each annealing machine 103. Each annealing machine 103 performs calculations independently and sends the result to the server 104. It is noted that the coefficients, the initial value of the spin, the randomness applied at the time of calculation, and the like are different between the annealing machines 103.

A solution acquisition unit 703 of the server 104 determines the best result by performing processing such as majority decision and averaging based on the result of each annealing machine. In this embodiment, the annealing machine 103 only receives data from the server 104 before the optimization calculation and, after that, transmits the result to the server 104, so that communication between the annealing machines 103 is not required. In this embodiment, parallel solving can be performed at high speed.

Seventh Embodiment

<Peer-To-Peer Connection Reservoir>

Figure 8A:
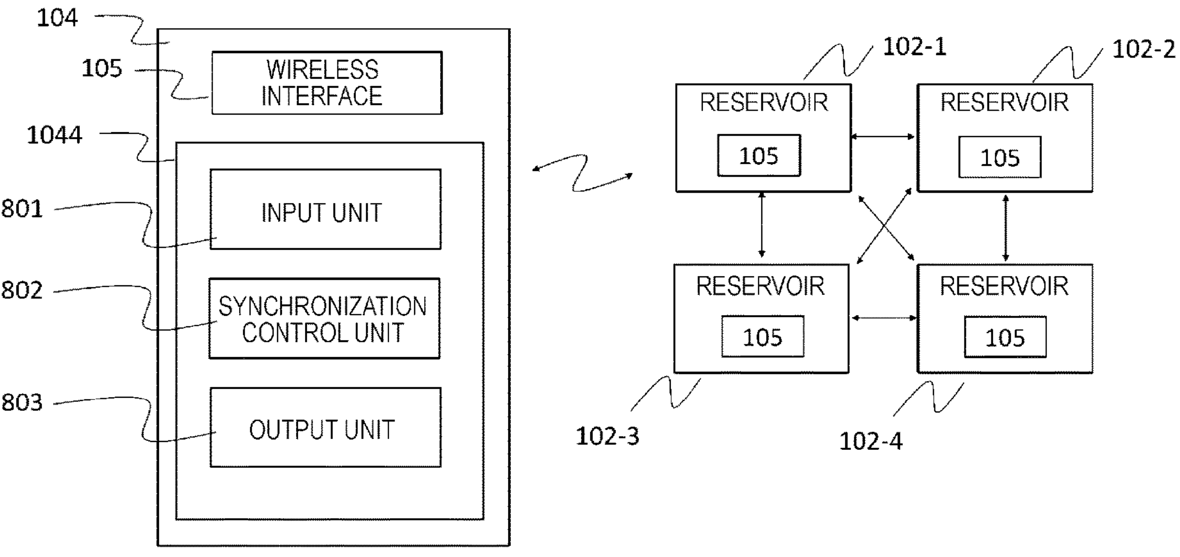
FIG. 8A is a block diagram illustrating an example of a system in which reservoir computing of a seventh embodiment is scaled up by wireless connection.

FIG. 8A is a block diagram illustrating an example of a system in which the reservoir computing is scaled up by wireless connection. The reservoirs 102-1 to 102-4 as a whole constitute one reservoir layer.

Figure 8B:
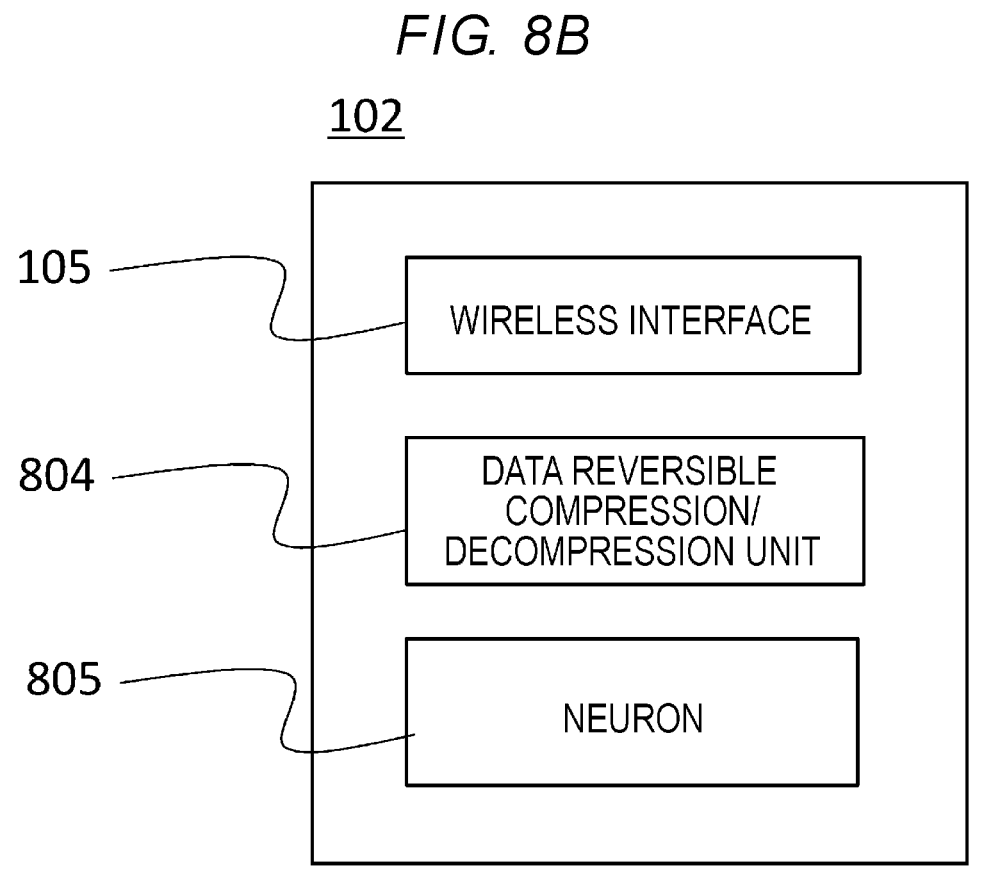

FIG. 8B illustrates an internal block diagram of the reservoir 102. The wireless interface 105 transmits and receives data. A data reversible compression/decompression unit 804 compresses the data to be transmitted and decompresses the received data. A neuron 805 is a set of neurons that are connected in a known manner to form the reservoir layer.

FIG. 8C illustrates functions shared by the server 104 and the reservoir 102 in the system of FIG. 8A, data to be transmitted, and transmission destinations.

FIG. 8D is an operation time chart of the reservoirs 102-1 to 102-4 of FIG. 8A.

The operations will be described with reference to FIGS. 8A, 8B, 8C, and 8D. An input unit 801 of the server 104 broadcasts an input data D to each reservoir 102. When the input data D is an n-dimensional vector, a data of x1(t) to xn(t) is transmitted to each reservoir 102. When the feature extraction is performed by the reservoir computing, a sensor signal or a signal to which pre-processing such as a filter is added is used as an input signal of the reservoir 102. Data transmission/reception is performed via the wireless interface 105 (the same applies hereinafter).

In addition, a synchronization control unit 802 of the server 104 broadcasts the synchronization signal S. Each reservoir 102 includes the synchronization signal receiving circuit and the counter and guarantees synchronization between the reservoirs 102 by resetting the counter to zero at the timing of receiving the synchronization signal and, after that, increasing the value of the counter by the internal clock and switching each operation based on the value of the counter.

Each reservoir 102 broadcasts (T) the current time output value of the neurons included in the own reservoir to the other reservoirs and the server 104. At this time, although the order is arbitrary, for example, the reservoir 102-1 performs the transmission process (T) for transmitting the output of the own neuron of the reservoir 102-1 to the reservoirs 102-2 to 102-4, and the reservoirs 102-2 to 102-4 and the server 104 receives (R) the output of the neuron. After that, each reservoir 102 sequentially alternates between transmission and reception roles.

Each reservoir 102 updates (NU) the neuron value based on the neuron values from the other reservoirs and the input signal from the server 104. Each reservoir 102 compresses (P) the updated neuron output information and moves to the processing of the next cycle. FIG. 8D illustrates a time chart for two cycles, and the process is basically repeatedly executed at the timing of data input to the input unit (input layer) of the server 104.

In the time chart of FIG. 8D, the portions from the synchronization signal+the input data value distribution (S/D) to the compression (P) become processing for one time input value (one cycle of data). Therefore, the value of each neuron (node) is updated by one cycle based on the above-described input data, the output value of the current neuron, and the output values of the other neurons. For this reason, each reservoir 102 needs to collect all (or some) neuron values at the current time. In this system, the neuron values of other reservoirs 102 can be collected by wireless transmission. In order to finish the broadcast in a short time, similarly to that described in the fifth embodiment, the broadcast may be performed all at once by using the frequency-division multiplexing or the code-division multiplexing.

Since the output of the neurons of each child device can be regarded as a two-dimensional image, in the compression process (P), the data reversible compression/decompression unit 804 performs compression (P) by the reversible compression such as a graphics interchange format (GIF) and performs transmission. On the receiving side, by decompressing the received data, the output value of the current neuron 805 on the transmitting side is obtained. Accordingly, the updating of the neuron 805 can be achieved. In the case of the reservoir, since this method is a calculation method that is relatively vulnerable to an output error of the neuron, a reversible compression method that does not deteriorate the information such as a run-length code is preferable to an irreversible compression method.

The neuron output of the reservoir 102 is, for example, a 32-bit continuous value. In the case of compressing the overhead of transmitting and receiving neuron output between the reservoirs 102, it is effective to preferentially broadcast the important high-order bits. For this reason, the method of transmitting is as follows.

The most significant bit of neuron 1, the most significant bit of neuron 2, . . . , the most significant bit of neuron N,
- the second bit of neuron 1, the second bit of neuron 2, . . . , the second bit of neuron N,
- the third bit of neuron 1, the third bit of neuron 2, . . . , the third bit of neuron N, and . . .
- are preferentially transmitted from the most significant bit of each neuron. This transmission method can be adopted instead of the data compression.

As described earlier, when receiving the synchronization signal from the server 104, each child device resets the counter of the child device to zero, and after that, the counter is incremented based on the internal clock of the child device. Herein when the counter reaches a predetermined value, it is considered that the time has expired, and the above-described transmission is terminated. In this method, not all information can be broadcasted completely, but the overall processing time is shortened by limiting the communication time, and the deterioration of the accuracy is also limited by transmitting from the high-order bits as described above. It is noted that the upper limit of the counter for considering that the time has expired can be dynamically adjusted so as to be reduced (shortened) when the server 104 determines the result of the task and determines that higher speed is required and so as to be increased (lengthened) when the server 104 determines that higher accuracy is required.

An output unit 803 of the server 104 receives the output of each reservoir 102 and functions as an output layer. In the reservoir computing, the output layer receives the output of all or some of the neurons in the reservoir layer and performs a product-sum operation by using the learned weights. In this embodiment, since the server 104 plays the role of the output layer, each reservoir 102 transmits the output of the neurons contained in the reservoir 102 to the server 104, which is the output layer. The output unit 803 of the server 104 outputs a time-series output signal for each cycle.

It is noted that, in this embodiment, the output layer of the server 104 does not provide feedback to each reservoir 102, but the output from the output unit 803 of the server 104 maybe configured to be wirelessly transmitted to at least one of the reservoirs 102.

Eighth Embodiment

<Star Connection Reservoir>

FIG. 9A is a different example from the seventh embodiment and is an example of a star connection in which the same processing is performed in the plurality of reservoirs 102-1 to 102-4. The plurality of reservoirs 102-1 to 102-4 share the roles of the reservoir layer and the output layer and perform calculations independently. It is noted that the reservoirs 102 are respectively different in terms of a pattern of connections between the neurons in the reservoir layer, parameters (weights, and the like) and shapes of activation functions of the neurons in the reservoir layer, initial values of the outputs of the neurons in the reservoir layer, parameters (weights, and the like) of the neurons in the output layer, and the like.

FIG. 9B illustrates the functions shared by the server 104 and the reservoir 102 in the system of FIG. 9A, the data to be transmitted, and the transmission destinations. In this example, although the output layer is shared by the reservoirs 102, in a case where the reservoir 102 does not have an output layer, the server 104 may be provided with the respective output layers for the four child devices.

Figure 9C:
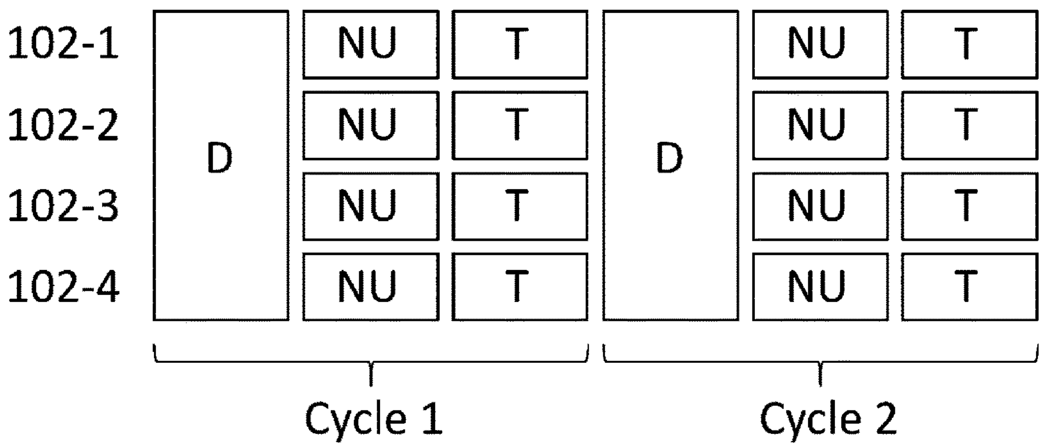
FIG. 9C is an operation time chart of the reservoir of the eighth embodiment.

FIG. 9C is an operation time chart of the reservoirs 102-1 to 102-4 of FIG. 9A.

The operations will be described with reference to FIGS. 9A, 9B, and 9C. The input unit 901 of the server 104 broadcasts the same input data to each reservoir 102 (D). Each reservoir 102 performs the calculations independently (NU) and transmits the result from the output layer to the server 104 (T). At the time of transmission, interference is prevented by using time division multiplexing, code-division multiplexing, frequency-division multiplexing, space-division multiplexing, and the like.

A solution acquisition unit 903 of the server 104 determines the best result by taking a majority decision or an average value of the results of each reservoir 102. Parallel solving can be performed at a high speed.

In this embodiment, the same problem can be solved by the plurality of reservoirs, and the best result can be determined by the server, so that high-speed parallel computing can be achieved.

Ninth Embodiment

<Hierarchical Connection DNN>

Figure 10A:
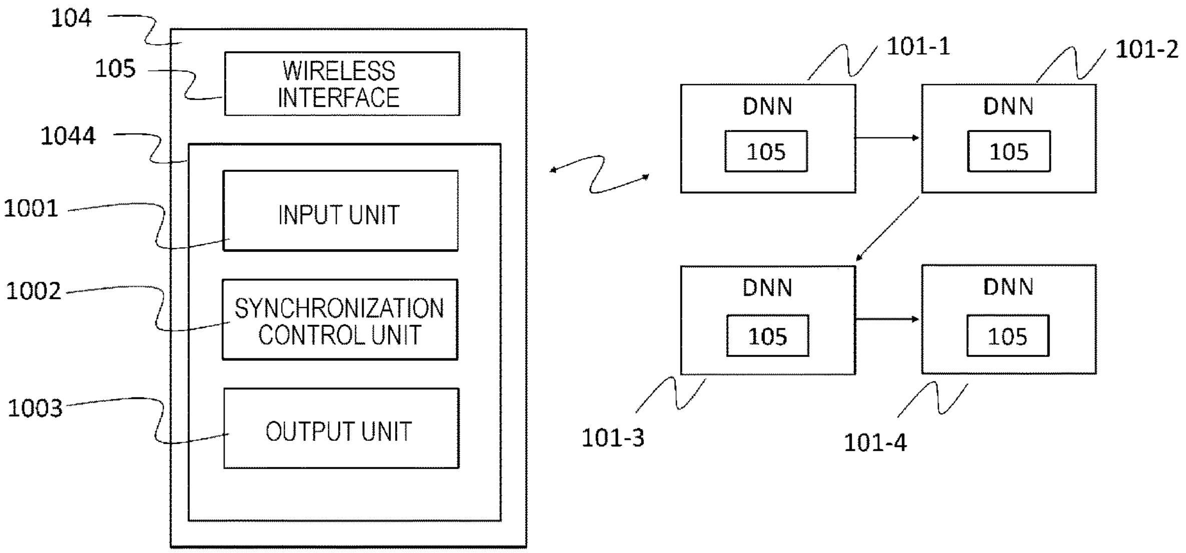
FIG. 10A is a block diagram illustrating an example of a system in which a DNN of a ninth embodiment is scaled up by wireless connection.

FIG. 10A is a block diagram illustrating an example of a system for scaling up the DNN by wireless connection. The DNNs 101-1 to 101-4 as a whole constitute one DNN.

FIG. 10B illustrates functions shared by the server 104 and the DNN 101 in the system of FIG. 10A, data to be transmitted, and transmission destinations.

The operations will be described with reference to FIGS. 10A and 10B. An input unit 1001 of the server 104 transmits the input data to the DNN 101-1. When the input data D is an n-dimensional vector, the data of x1(t) to xn(t) is transmitted.

In the deep learning, the DNNs 101-1 to 101-4 are connected in series, and data is sequentially transmitted from the previous layer. In the figure, the hidden layer is configured with four layers, but the number of layers is changed according to the task. For a simple task, a small number of layers may be sufficient, but as the complexity increases, the number of layers is increased. Unlike the reservoir computing and the annealing machine, the deep learning can perform a complex task by increasing the number of layers. For this reason, the desired task can be achieved by connecting the child devices in series to secure the required number of layers. In addition, in the figure, each child device has one convolution layer and one pooling layer, but each child device may have more layers or various types of layers.

In order to prevent interference, the wireless communication between the DNNs 101-1 to 101-4 may be performed by frequency-division multiplexing, code-division multiplexing, or space-division multiplexing. In addition, for high-speed communication, transmission and reception may be performed in parallel by using a plurality of antennas, transceivers, and frequency channels.

In addition, the synchronization control unit 1002 of the server 104 broadcasts the synchronization signal S. Each DNN 101 includes the synchronization signal receiving circuit and the counter and resets the counter to zero at the timing of reception to guarantee synchronization between the DNNs 101.

Tenth Embodiment

<Star Connection DNN>

In another example from the ninth embodiment, it is possible to perform star connection in which the plurality of DNNs 101 perform the same feature extraction task. The plurality of DNNs 101-1 to 101-4 share the roles of the hidden layer and the output layer and perform calculations independently. The server 104 shares the role of the input layer. Each DNN 101 differs from each other in the location of pruning of the neurons and the connections between the neurons, the parameters (weights and the like) of the neurons, the shape of activation functions, the initial values (in the case of a recurrent deep neural network) of the outputs of the neurons, and the like.

The input layer of the server 104 broadcasts the input data to the DNNs 101-1 to 101-4. The DNNs 101-1 to 101-4 perform calculations independently and in parallel and transmit the results to the solution acquisition unit of the server 104. During transmission, interference is prevented by using time division multiplexing, code-division multiplexing, frequency-division multiplexing, space-division multiplexing, and the like.

The solution acquisition unit of the server 104 determines the best result by taking a majority decision or an average value of the results of each DNN 101. Parallel solving can be performed at high speed.

In this embodiment, the same problem can be solved by the plurality of DNNs, and the best result can be determined by the server, so that high-speed parallel computing is possible.

Eleventh Embodiment

<Ensemble DNN>

In the deep learning, it is known that one task is calculated separately by the plurality of different DNNs (called ensembles), and the calculation results are combined to improve inference accuracy. Although the tenth embodiment is also based on the ensemble method, in this example, in particular, the plurality of DNNs of which parameters (neuron weights, and the like) have been learned from different data sets are used as the ensemble. These DNNs have different network structures and different weight parameter sets.

Using the plurality of DNNs as an ensemble in the star connection similar to that of the tenth embodiment, the server 104 broadcasts an input signal corresponding to a single task to each DNN and receives and combines the output results of the respective DNNs to improve the inference accuracy.

In the information processing systems described in the first to eleventh embodiments, the synchronization of each child device is performed based on the synchronization signal transmitted from the server. As an alternative method, each device may be provided with a clock such as an atomic clock that can accurately measure the absolute time and may be operated with reference to the time of the atomic clock or the like. In addition, in order to guarantee the temporal context of the data to be transmitted and received, each device may include the time stamp in the transmission data and transmit the time stamp.

In each of the above-described DNNs, compression/decompression of data transmission/reception may be performed in the same manner as in the reservoir.

Twelfth Embodiment

<Simultaneous Multi-Connection Pipeline>

In the information processing systems described in the first to eleventh embodiments, in order to connect entire wide area social system and control the entire system without delay, it is necessary to operate data collection, data processing, and system control in real time. In the wide-area social system, individual devices are physically distributed and arranged, and the communication means and a distance between the devices are not always uniform. Therefore, it is desirable to connect the data transmitted/received by a plurality of the communications and the plurality of edge AIs (the DNN 101, the reservoir 102, the annealing machine 103, and the like) with guaranteed synchronization.

FIG. 11 is a conceptual diagram illustrating an example in which a plurality of data are simultaneously processed by the prediction planning unit 100 in real time. In some cases, the plurality of data 1 to 5 transmitted from the sensor 200 or the like may be connected by a mixture of wireless communication having different specifications such as 5G and 6G and wired communication having different specifications. In addition, the physical position such as the near or far positions of the transmission source maybe different. Furthermore, it is considered that the connection relationship and the conditions of uplink communication, downlink communication, side link, and the like are not the same. It is considered that, since the data received in this manner includes at least one of data obtained from different sensors, data via different routes, and data by different communication means, the latency of each data is different, and the order of data arrival to the prediction planning unit 100 is not the order of data generation.

In this case, if the data is stored once as a database and, after that, processed, the order of the data can be guaranteed, but the real-time processing is not realized. In this embodiment, real-time data processing is enabled by adding functions of a simultaneous multi-connection pipeline 1100. The simultaneous multi-connection pipeline 1100 includes functions of a data flow controller 1110 and a time-space organizer 1120. The data flow controller 1110 manages the order of data analysis and transmits the data to the prediction planning unit 100 in the order of processing. The setting of the data flow controller 1110 is controlled by, for example, an AI orchestrator 1045. The time-space organizer 1120 labels the received data (for example, various sensor data) with a data generation time and a data generation position based on, for example, the measurement result of the arrival time of the received data, the measurement result of the time taken for the arrival, the time stamp of the received data, the measurement result of the position of the sensor, and the like.

Thirteenth Embodiment

<Hierarchical Edge>

Figure 12:
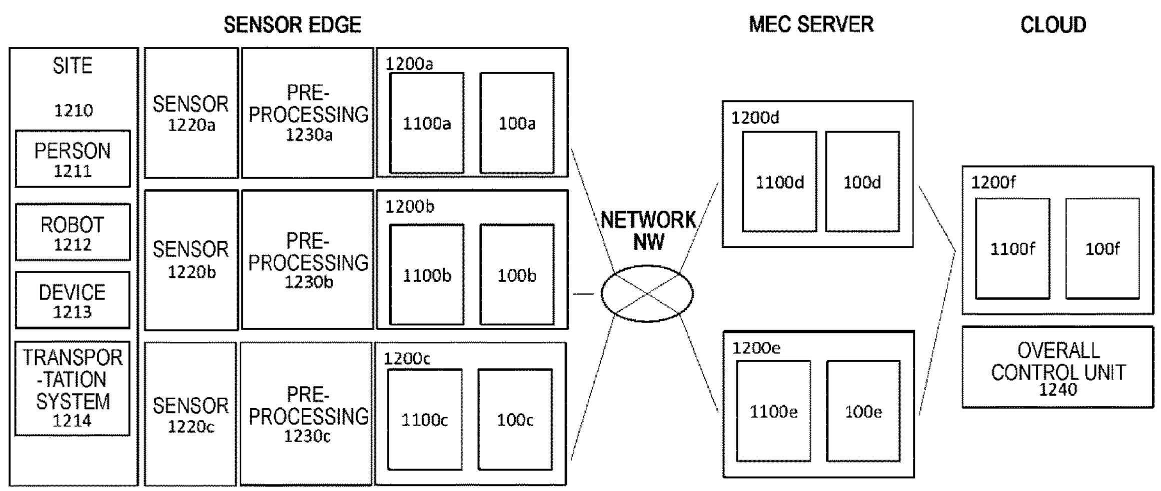
FIG. 12 is a block diagram illustrating an example of an edge having a hierarchical structure of a thirteenth embodiment.

FIG. 12 is a block diagram illustrating an example of an edge having a hierarchical structure in which an edge 1200 is configured with a set of the prediction planning unit 100 and the simultaneous multi-connection pipeline 1100 of FIG. 11. The prediction planning unit 100 and the simultaneous multi-connection pipeline 1100 may be physically separated. Each of edges 1200*a* to 1200*f* may be configured based on the same reference architecture. These edges 1200*a* to 1200*f* can define necessary functions by software according to roles of the edges. The edges 1200*a* to 1200*f* are configured with, for example, a general server, a computer, or dedicated hardware, and the functions of the edge 1200 are implemented by software.

In FIG. 12, an example in which each edge 1200 includes the prediction planning unit 100 is illustrated. The prediction planning unit 100 includes a parent device (server 104) and child devices 101 to 103, for example, as disclosed in FIG. 1. However, the parent device and the child device do not necessarily exist at the same edge. For example, the MEC server or the server 104 of the edges 1200*d* to 1200*f* of the cloud may control the child devices 101 to 103 of the edge 1200*a*. In this case, the server 104 may not be necessarily arranged on the edge 1200*a*. The parent device that controls the child devices as described above can be arranged at an arbitrary edge in the hierarchical edge in consideration of the required processing amount and communication amount.

The edges 1200*a* to 1200*c* are, for example, sensor edges that are placed near a site 1210 including a person 1211, a robot 1212, various devices 1213, the transportation system 1214, and the like as control targets. A sensor unit 1220 and, if necessary, a pre-processing unit 1230 are attached to the edges 1200*a* to 1200*c*. The pre-processing unit 1230 performs desired processing such as filtering, data compression, data division, encoding, and the like. As described with reference to FIG. 5, feature extraction may be included in the pre-processing. By performing the pre-processing on the sensor side, the amount of data to be transmitted can be reduced.

The sensor unit 1220 may include functions of a programmable logic controller (PLC) and X reality (XR) in addition to various sensors and cameras. The PLC and the XR function as means for collecting data in the same manner as sensors and cameras. The various sensors, cameras, PLCs, and XRs of the sensor unit 1220 collect and output the data of the robots and the like, and may be control targets to which the input from the edge 1200 is fed back. For example, the frequency of data acquisition and data transmission is changed by feedback. In this manner, it is possible to control the sensor unit 1220 correspondingly with the collection and control of the information on the robot or the person.

In one example, the data from the sensor unit 1220 is processed as it is or by the pre-processing unit 1230 to be transmitted to the edges 1200*a* to 1200*f*. The data is processed by the edge 1200, and the result of inference by the prediction planning unit 100 is displayed by the output unit 300, or fed back to the robot 1212, various devices 1213, and the transportation system 1214 of the site 1210 and the sensor unit 1220. In another example, the output of one or more edges 1200 may be the input of the other edge.

It is assumed that various wired and wireless communication means are used for a network NW. As the wireless communication means, various means such as 4G, P-LTE, 5G, Beyond 5G, 6G, Wi-Fi (trademark) and the like can be considered. Therefore, a deviation in the latency of the transmission data occurs depending on the positions of the edges 1200*a* to 1200*c* and the communication means used, as described with reference to FIG. 11.

The edges 1200*d* and 1200*e* are, for example, MEC servers arranged closer to the site 1210 than the cloud. Because the edge is near the site, the delay can be reduced compared with the cloud. For example, the edges 1200*d* and 1200*e* are installed on a base station of the network NW.

The edge 1200*f* is configured with, for example, a cloud server installed in the cloud or at the entrance of the cloud. An overall control unit 1240 maybe attached to the edge 1200*f* or may be connected to the edge 1200*f* by a network. Deployment of the functions of the edges 1200*a* to 1200*f* can be performed via, for example, the overall control unit 1240. The deployment procedure may follow the related art.

In the prediction planning unit 100 of each of the edges 1200*a* to 1200*f* and the simultaneous multi-connection pipeline 1100 included in this system, necessary functions are deployed for each edge. For example, prediction planning units 100*a* to 100*c* of the edges 1200*a* to 1200*c* near the site 1210 perform simple processing (for example, recognition), and a prediction planning unit 100*f* of the edge 1200*f* of the cloud performs complicated processing (for example, understanding and determination). The simultaneous multi-connection pipeline 1100 forms a data flow suitable for the processing performed by the prediction planning unit 100.

The simultaneous multi-connection pipeline 1100 guarantees a temporal order of the data required for the processing of the prediction planning unit 100. It is desirable that the temporal order of the data is performed strictly (for example, in milliseconds) in the motion control of, for example, an industrial robot. In addition, macroscopic control of the flow of persons does not require such strictness (for example, in minutes). In this embodiment, the specifications of the prediction planning unit 100 and the simultaneous multi-connection pipeline 1100 can be optimized for each edge.

<Details of Edge>

Figure 13:
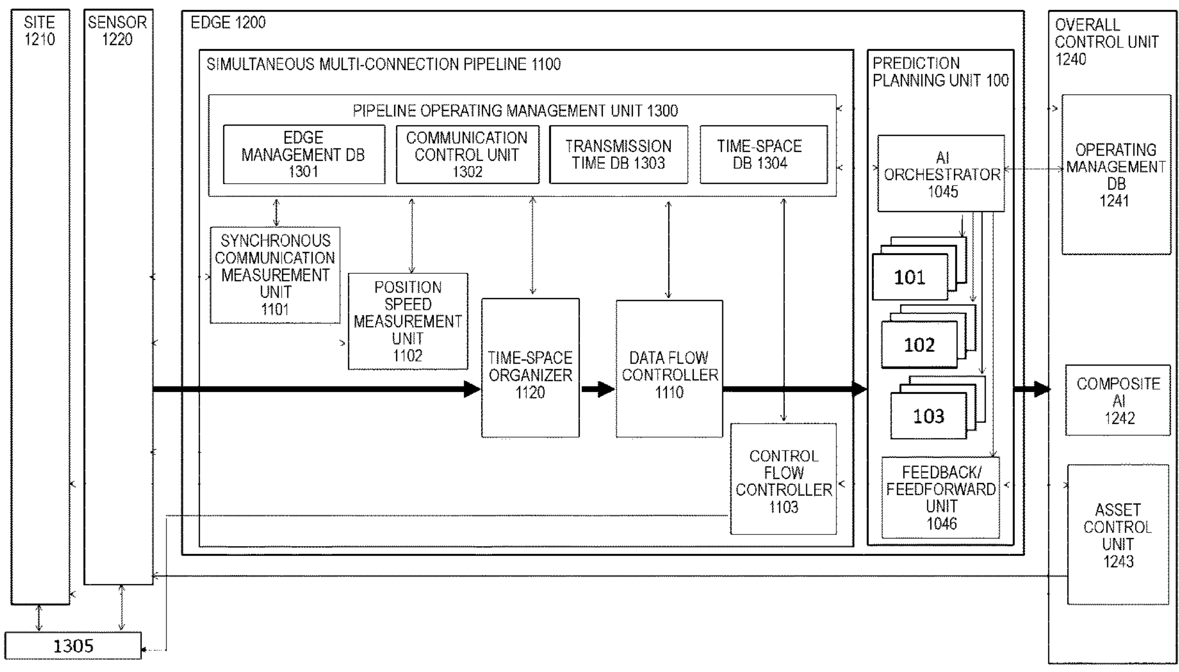
FIG. 13 is a block diagram illustrating details of the edges of the thirteenth embodiment.

FIG. 13 is a block diagram illustrating the details of the edge 1200. Although only one edge 1200 is illustrated in FIG. 13, the overall control unit 1240 may manage a plurality of the edges 1200 as illustrated in FIG. 12. The edge 1200 includes the simultaneous multi-connection pipeline 1100 and the prediction planning unit 100. The data flow is indicated by thick arrows, and the control flow is indicated by thin arrows in one or two directions.

The prediction planning unit 100 includes any combination selected from the DNN 101, the reservoir 102, and the annealing machine 103, as in the embodiments already described. In addition, the prediction planning unit 100 includes an AI orchestrator 1045 and a feedback/feedforward unit 1046. The AI orchestrator 1045 and the feedback/feedforward unit 1046 are portions of the functions of the server 104 and are stored as programs in the storage device 1044.

The simultaneous multi-connection pipeline 1100 includes the data flow controller 1110 and the time-space organizer 1120 described with reference to FIG. 11. In addition, the simultaneous multi-connection pipeline 1100 includes a synchronous communication measurement unit 1101, a position/speed measurement unit 1102, and a control flow controller 1103. The function of the simultaneous multi-connection pipeline 1100 is a portion of the function of the server 104 and is stored as a program in the storage device 1044. In this case, the AI orchestrator 1045, the feedback/feedforward unit 1046, and the simultaneous multi-connection pipeline 1100, which are separate blocks in FIG. 13, are implemented by software in the same server 104. Alternatively, the simultaneous multi-connection pipeline 1100 may be configured with a server or the like different from the server 104 and connected to the prediction planning unit 100.

The overall control unit 1240 includes an operating management DB 1241, a composite AI 1242, and an asset control unit 1243 including a graphical user interface (GUI).

For example, when a user as an administrator of the site 1210 implements a desired function on the edge 1200, the user can perform setting of the prediction planning unit 100 and the simultaneous multi-connection pipeline 1100 through the overall control unit 1240. The operating management DB 1241 stores the configurations of the subordinate prediction planning units **100*a* to 100*f* and the simultaneous multi-connection pipelines 1100*a* to 1100*f*. The configurations of the prediction planning unit 100 and the simultaneous multi-connection pipeline 1100 are transmitted to the AI orchestrator 1045**.

The AI orchestrator 1045 performs selection of patterns 1 to 6, selection of calculation types of the DNN 101, the reservoir 102, the annealing machine 103, and the like based on the selection, designation of a connection form (peer-to-peer connection or star connection) for each calculation type, selection of the child device to be used, designation of necessity or unnecessity of the connection required for each connection between the child devices, and the like. In addition, the AI orchestrator 1045 instructs the order of the data to be input to the prediction planning unit 100 to a pipeline operating management unit 1300. The order of data includes the order of arrival, the order of transmission time, the order of distance, and the like. These settings are performed from the asset control unit 1243 or a user terminal 1305 connected via the network according to the processing contents of the DNN 101, the reservoir 102, the annealing machine 103, and the like. In addition, the operating management DB 1241 also has a backup function as a mirror site for recovery in the time of a trouble in the edge 1200. The learning of the DNN 101 and the reservoir 102 may be performed by the overall control unit 1240 or may be performed by the edge 1200.

It is noted that the composite AI 1242 performs calculations that do not need to be performed in the edge 1200 or may be performed at the cloud. An example of a calculation that does not need to be performed by the edge 1200 is a case where a delay of a predetermined time or more is allowed. For example, an operation that does not deviate from the routine operation may be processed in the cloud. An example of a calculation that may be performed in the cloud is a prediction using a large amount of big data that cannot be stored in the edge. A large amount of data will be stored in the cloud and processed by the composite AI 1242. The acquired data and the calculation results are also assumed to be saved in the cloud.

The edge 1200 on which the DNN 101, the reservoir 102, the annealing machine 103, and the like are implemented can process data from the sensor unit 1220 or the other edges 1200.

The pipeline operating management unit 1300 includes an edge management DB 1301, a communication control unit 1302, a transmission time DB 1303, and a time-space DB 1304.

The edge management DB 1301 manages basic information on the person 1211, the robot 1212, various devices 1213, the transportation system 1214, and the like which are arranged at the site 1210 connected to the edge. The edge management DB 1301 also manages basic information of the similarly connected sensor unit 1220. The edge management DB 1301 also manages basic information of a communication line used for connection. The basic information is the standard and specifications of each device and line.

In addition, the edge management DB 1301 manages the correspondence between the data flow sent from the sensor unit 1220 and the input terminals of the DNN 101, the reservoir 102, the annealing machine 103, and the server 104. The correspondence is set based on the information regarding the configuration of the sensor unit 1220 and the information regarding the configuration of the DNN 101, the reservoir 102, and the annealing machine 103. The setting can also be performed by the user. For example, in the examples of the tenth and eleventh embodiments, the same data flow may be transmitted (broadcasted) in parallel to each DNN 101, or the data flow may be first transmitted only to the server 104 and, then, transmitted from the server 104 to each DNN 101 in parallel. In the example of the seventh embodiment, the same data flow may be transmitted in parallel to each reservoir 102, or the data flow may be first transmitted only to the server 104 and, then, transmitted from the server 104 to each reservoir 102 in parallel. In the example of the ninth embodiment, the data flow may be transmitted only to the DNN 101-1 or only to the server 104. The information of the edge management DB 1301 such as the information for controlling the data flow is input from the operating management DB 1241 via the AI orchestrator 1045 or separately. As described above, how the data flow controller 1110 rearranges, divides, and transmits the data flow depends on the configuration of the sensor unit 1220 and the configuration of the child device of the prediction planning unit 100.

The communication control unit 1302 controls the timing of measurement and notification of the data transmitted from the sensor unit 1220 by a known technique via the control flow controller 1103. In addition, the communication control unit 1302 collectively controls the entire communication processing performed by the edge 1200. The settings of the communication control unit 1302 are input from the operating management DB 1241 via the AI orchestrator 1045 or separately.

The transmission time DB 1303 and the time-space DB 1304 store the data collected according to the operating of the edge 1200 as described later. For the backup and the like, it is assumed that the data of the pipeline operating management unit 1300 is appropriately duplicated in the operating management DB 1241.

The synchronous communication measurement unit 1101 includes a reference clock that serves as a reference of a quartz clock, an atomic clock, or the like. The synchronous communication measurement unit 1101 broadcasts the time of the reference clock to the sensor unit 1220, which is a data transmission source. The channel to be broadcasted is, for example, a 5G wireless channel. Although causing a cost increase, the broadcast may be omitted by providing each sensor unit 1220 with the atomic clock or the like. With such a configuration, each sensor unit 1220 can be provided with a common clock, so that the time stamp can be attached to the transmission data in a common time axis. The synchronous communication measurement unit 1101 can calculate the data transmission delay time (time required for transmission) from each sensor unit 1220 from the difference between the time stamp of the received data and the time of the reference clock of the synchronous communication measurement unit 1101 at the time of the data reception. A data transmission delay time corresponding to each sensor unit 1220 is recorded in the pipeline operating management unit 1300 as the transmission time DB 1303.

The position/speed measurement unit 1102 measures the position and speed of the person 1211, the robot 1212, various devices 1213, and the transportation system 1214 or the sensor of the sensor unit as the control targets. The position and moving speed of the control target can be measured by a global positioning system (GPS), a global navigation satellite system (GNSS), or the like provided to the control target. Since the position accuracy of the GPS and the GNSS is on the order of 1 meter, real time kinematics (RTK) or the like is used to obtain even higher accuracy. In the RTK, the position information of the GPS or the GNSS is acquired at two locations, that is, the control target and the position/speed measurement unit 1102, the position information of the position/speed measurement unit 1102 is broadcast-transmitted to the control target side, and a deviation in the position information is corrected by using the difference between the position/speed measurement unit 1102 and the control target, so that the accuracy of several centimeters can be realized. In addition, the position information can be corrected by using the information of the camera that images the control target and the millimeter wave emitted from the base station used in 5G or post 5G. With such a configuration, accurate position information of the transmission source can be added to the transmission data from each sensor unit 1220. In addition, the transmission data may include data acquired by various sensors such as a weight sensor, an optical sensor, an image sensor, and a thermal sensor instead of the position information or in addition to the position information.

The time-space organizer 1120 labels the received data with time information, position information, and other sensor information. Specifically, the data transmission time (which can be regarded as equal to the data generation time) is calculated by subtracting a delay time of a delay time data table from the arrival time of the received data. The calculated data generation time and position information are added to the received data as a header. Accordingly, it is possible to represent the received data collection time and position in four-dimensional coordinates, and thus, the time-space DB 1304 can be generated in the pipeline operating management unit 1300. In addition, the time-space organizer 1120 can monitor the delay and the jitter from the transmission delay time of the data measured by the synchronous communication measurement unit 1101. In addition, the sensor unit 1220 can be classified and sliced based on the delay and the jitter.

The data flow controller 1110 rearranges the received data so that the analysis is performed in the order of data generation time for the real-time processing in the prediction planning unit 100. For this reason, the data flow controller 1110 has a buffer function for rearranging the received data based on the labeling applied to the data by the time-space organizer 1120. As a specific implementation example, data rearrangement is performed by temporarily storing the data in a work memory such as a dynamic random access memory (DRAM) or a static random access memory (SRAM) as a data buffer. The data flow controller 1110 may also attach a destination header to the data rearranged according to the information of the edge management DB 1301 and transmit the data to the plurality of DNNs 101, the reservoirs 102, and the annealing machines 103.

In addition, the data flow controller 1110 may send data to the prediction planning unit 100 in the order of arrival, in addition to the mode in which the data is rearranged in the above-described time order. This mode can be applied to a case where the time order of data is not strictly required, and thus, the prediction results and the action planning results can be obtained in the shortest time. Alternatively, the data of the specific sensor may be preferentially sent to the prediction planning unit 100 in order to perform the analysis focusing on the specific position of the transmission source. For example, when a change of any one of the robots or drones occurs during monitoring the robots or drones on the entire floor of a factory or the like, it is desired to specify and trace the position of the one and preferentially analyze the behavior.

The control flow controller 1103 distributes a control signal to the control target of the site 1210 and the sensor of the sensor unit 1220 according to the instruction of the communication control unit 1302. The control signal is a feedback signal generated by the feedback/feedforward unit 1046 based on the outputs of the DNN 101, the reservoir 102, and the annealing machine 103 or a feed forward signal generated by the feedback/feedforward unit 1046 according to the instruction of the asset control unit 1243.

The asset control unit 1243 serves as a user interface for setting the contents of the edge 1200 as described above and also serves as an interface with which the user directly controls the control target of the site 1210 or the sensor of the sensor unit 1220 based on the prediction result output by the edge 1200. The asset control unit 1243 may be configured to perform desired control by inputting from the user terminal 1305.

Fourteenth Embodiment

<Details of AI Learning>

As known, the DNN 101 and the reservoir 102 constitute a network of neurons, and after learning the parameters such as weights, the inference, that is, the execution of the AI can be performed. Some learning methods that can be adopted in this embodiment will be described below.

In the first method, learning is performed by forming the same configuration (replica) in the server 104 as the neuron network configuration of the DNN 101 and the reservoir 102 in a closed form in the server 104. Since learning is performed only in the server 104, learning can be performed at a high speed. The replica may be generated by allowing the AI orchestrator 1045 to imitate the structure of the actual DNN 101 or the actual reservoir 102 including the connection between the child devices.

In the case of the reservoir 102, the replica of the network of the reservoir layer is prepared in the server 104, and the learning is performed by using the original input layer and the original output layer included in the server 104 (refer to FIG. 8C). As the teacher data, an input teacher signal and an output teacher signal corresponding to the task are generated in the server 104. For the information necessary for generating the teacher data, for example, the past data stored in the operating management DB 1241 is read out and used. Only the parameters (weights and the like) of the output layer are learned. The parameters (weights and the like) of the neurons in the reservoir layer and the corresponding parameters in a replica configuration are fixed to values set randomly in advance. Since only the parameters of the output layer in the server 104 are learned, it is not necessary to transmit the learning result to each reservoir 102.

In the case of the DNN 101, similarly to the case of reservoir computing, learning can be performed by using the replica configuration of the DNN separately provided in the server 104. In the DNN learning, the parameters (weights and the like) of all or some neurons are learned. Unlike the case of the reservoir computing, since the learned parameters need to be reflected on the corresponding neurons of the corresponding DNN 101, the information of the learned parameters is transmitted from the server 104 to each DNN 101 by using, for example, the wireless interface 105 to set the parameters.

It is noted that, in the case of reservoir computing, the parameters of the neurons in the reservoir layer may be learned in the same manner as in the DNN. In that case, similarly to the case of the DNN, the learned parameters of the neurons maybe transmitted from the server 104 to each reservoir 102 to be set.

In the second method, the neuron networks of DNN 101 and the reservoir 102 are used as they are, and learning is performed with the same configuration as at the time of inference.

In the case of reservoir computing, the input teacher signal and the output teacher signal are generated in the server 104, and the input teacher signal is broadcasted to each reservoir 102 by the wireless interface 105. The server receives the neuron output of each reservoir 102 and processes the neuron output in the output layer of the server. By comparing the output signal (that is, the output signal as the reservoir computing) of the output layer with the output teacher signal, the parameters (weights and the like) of the output layer in the server 104 are updated so that the difference approaches zero. Since the updating of the parameters occurs only in the server 104, it is not necessary to transmit the parameters from the server 104 to each reservoir 102 at the time of updating, and learning can be performed at a high speed.

In the case of the DNN (assuming that child devices are connected in series), the input teacher signal and the output teacher signal are generated in the server 104, and the input teacher signal is transmitted to the DNN 101-1 which plays the role of the first stage of the DNN (refer to FIGS. 10A and 10B). The server 104 receives the output (that is, the output as the deep learning) of the DNN 101-4, which plays the role of the final stage of the DNN. By comparing the output signal with the output teacher signal, the parameters (neuron weight and the like) of each DNN 101 are updated so that the difference approaches zero. The transmission from the server 104 to each DNN 101 is required in order to update the parameters. Therefore, this learning is slower than the learning with replicas.

In the first method using the replica in the server, in a case where the circuit configurations of the child device and the parent device (server) are not exactly the same, a deviation in the characteristics occurs, and thus, in terms of accuracy, the first method is inferior to the second method using the actual device. In particular, in a case where the child device is implemented with an analog circuit that is oriented for low power consumption, due to the manufacturing variation of the analog circuit and the circuit characteristic fluctuation caused by the temperature and power supply voltage fluctuation, a deviation occurs in the characteristics (weight value and the like) between the replica in the server and the actual object in the child device. By the second method, learning is periodically performed by using an actual child device, and thus, it is possible to follow the characteristic fluctuation, so that high inference accuracy can be maintained. On the other hand, the method using a replica has an advantage that high-speed learning is possible as described above.

The above-described learning may be performed before the DNN 101 or the reservoir 102 is actually operated by assuming a task in advance or may be performed at an arbitrary timing during the actual operation in order to respond to a new task. In addition, the learning can be repeated periodically by the above-described method to perform additional learning. By the additional learning, it is possible to respond to changes in the situation of the site, changes in the sensor characteristics, changes in the settings of the data flow controller, and the like described later.

Although the example of the supervised learning has been described above, reinforcement learning or other known learning methods may be adopted. In the reinforcement learning, the server 104 evaluates the outcome of the current AI with some index while actually performing inferences, and the server 104 updates the weight of the output layer of the reservoir and the weight of the DNN based on the evaluation result. The learning function described above may be provided as a portion of the function of the AI orchestrator 1045.

Fifteenth Embodiment

<Stepwise Composite AI>

FIG. 14 is a block diagram illustrating a concept of the stepwise composite AI based on the system configurations of FIGS. 12 and 13. Since the data flow controller 1110 described in the previous embodiment rearranges the data flow in the order of occurrence of the actual events, it is possible to generate the data that accurately reflects the actual space and time, and it is possible to perform accurate inferences and predictions. On the other hand, since the data flow controller 1110 is a type of a buffer, data delay occurs in principle. Therefore, there is a trade-off between the accuracy and the delay time. In addition, in some cases, in the initial stage of the operation, obtaining of some inference result may be preferential. Therefore, in this embodiment, an example is illustrated in which the data flow controller 1110 can control the data flow according to the situation and the stage. As a specific example, when rearranging data based on the transmission timing on the sensor side, the ratio of the data to be arranged can be changed, and the processing accuracy and speed can be evaluated by changing the ratio of the data to be arranged.

First, the data flow controller 1110 cancels the data rearranging control and allows the prediction planning unit 100 to process the data in the order of arrival (S1401). In this case, in principle, the maximum speed calculation is possible with low delay (S1402).

Next, the data flow controller 1110 rearranges only the data flows from, for example, one or a plurality of predetermined sensors in the order of occurrence according to the settings of the AI orchestrator 1045 (S1403). The setting of which sensor the data flow is to be rearranged may be determined in advance or may be dynamically changed by the user. As a specific example, when changing the ratio of the data to be rearranged, in a case where there are a plurality of types of sensors on the sensor side, the data to be rearranged and the data not to be rearranged are separately controlled for each type of sensor. In addition to controlling for each sensor type, controlling may be performed for each transmission source, for each line, or based on arbitrary grouping. These can be identified based on the transmission source address, flag, and the like in the data flow.

As a result, according to the control conditions, the delay may be increased slightly, but the accuracy may be increased. The delay time and accuracy are evaluated, for example, by the overall control unit 1240 in comparison with the ideal delay time and accuracy conditions determined in advance (S1404). As described above, the data flow controller 1110 tries several (or all) combinations of the controlled data flows and the uncontrolled data flows.

In one method, all combinations are tried, and the combination with the best evaluation is used as the setting of the data flow controller 1110. In the above description, an example of switching the presence and absence of the data flow control for each sensor is illustrated, but there maybe other combinations such as for each device as a control target or for each position at the site. For example, a portion (or sensor) in which accuracy is important is attached with priority in advance, and the data flows in temporal order are rearranged in order of the priority.

In the above-described example, the order of the data flow input to the actual child device is changed, but in the case of adopting the first method of performing learning by using the replica described in the fourteenth embodiment, there may be a method in which the changed data flow is input to the replica and the replica is used for evaluation, and in the actual child device, the data flow controller 1110 is operated by switching to the best conditions obtained by the replica. In this method, the output of the prediction planning unit 100 gradually approaches the target delay time and accuracy conditions.

In another method, the ratio of the data flow to be controlled maybe gradually increased (for example, monotonically increased), and the setting of the data flow controller 1110 may be fixed when the delay time reaches a preset upper limit. In this case, the accuracy will be stepwise improved within the allowable range of the delay time.

Sixteenth Embodiment

<Future Prediction Feedforward AI>

FIG. 15 is a block diagram illustrating a concept of parallel implementation of current state analysis and future prediction based on the system configurations of FIGS. 12 and 13. In the hierarchical edge configuration as illustrated in FIG. 12, since the capabilities and specifications of the edges of each layer, the amount of data provided to the edges, and the transfer speed are different, it is possible to share the processing suitable for the edges of each layer.

In the composite AI 1242 (configured with the DNN, the reservoir, the annealing machine, and the like) of the overall control unit 1240 close to the cloud, big data can be used and there are resources that can process the big data, but the composite AI 1242 is disadvantageous for obtaining a real-time data due to the far distance from the site. Therefore, in the composite AI 1242, rough prediction of the future operation of the routine that does not need to consider a sudden event is performed by using not a real-time sensor data but the past history data of the DB (S1501).

The prediction planning unit 100 performs the prediction of the future for about 100 msec by using the DNN 101 and the reservoir 102 or the reservoir 102 (patterns 4 and 5 in FIG. 3). In addition, the action, trajectory planning, and the like are performed by using the DNN 101 or the reservoir 102 and the annealing machine 103 (Patterns 1 to 3, 6 in FIG. 3, S1502). The real-time sensor data is used as the input for this process.

The annealing machine sets and solves one optimization problem by using the time-series output for a plurality of (for example, 10,000) time steps obtained by the DNN feature extraction, the reservoir feature extraction, and the prediction. In this case, the solution throughput is 10,000 times slower, but the optimal action can be selected for more complex conditions.

For example, the server 104 sets a problem as an optimization problem in which the flow of persons in a city for 5 minutes is feature-extracted with the DNN 101 or the reservoir 102 and the results of the 5 minutes are used to equalize the flow of persons over the next 5 minutes (that is, the server 104 determines a coupling coefficient between the spins of the annealing machine 103). Furthermore, the coupling coefficient is transmitted to the annealing machine (problem setting is completed), and the annealing machine solves the problem over the next 5 minutes and returns the result to the server 104. The server 104 displays a recommended route, for example, on a display placed on a street corner based on the result. By periodically repeating the above-described 15-minute operation, it is considered that the congestion in the city is alleviated.

However, as clear from the above-described description, the processing by the annealing machine takes a longer time than the processing performed only by the DNN 101 or the reservoir 102. According to the feature extraction and prediction by only the DNN 101 or only the reservoir 102, processing and responding can be performed in more real time.

For example, estimating what a person wants to do next by feature extraction or prediction of the movement of the person, and supporting (or instructing) with an actuator or supporting (such as instructing the location of necessary tools or the like) with a wearable display or the like in advance are considered. For example, when a person tries to perform unsteady work remotely, in order to prevent a sense of discomfort from occurring in the time until the support is transmitted, it is preferable that the movement within 200 msec, which is the sensitivity of the brain, is predicted in advance. Predictions may be performed to detect not only the precursors of abnormalities but also the precursors of an atypical work. Furthermore, future predictions can be used to conceal communication delays that occur on the other side of the world and in communications with artificial satellites.

In order to further speed up the response, only the feature extraction of the DNN 101 and the reservoir 102 is performed from the real-time sensor data in the edge near the site, and it is possible to recognize device abnormalities at high speed and perform emergency stop response with respect to sudden operations.

The first to sixteenth embodiments described above can be carried out in appropriate combinations.

What is claimed is:

1. An information processing system configured to improve real-time data processing and system control, the information processing system comprising:

a parent device; and a plurality of annealing machines that are each communicatively interconnected and coupled to the parent device via a communication interface, wherein the communication interface includes at least one of a wireless network or a wired network, wherein each respective annealing machine among the plurality of annealing machines is configured to:

receive a synchronization signal that is broadcast by the parent device to each of the plurality of annealing machines, wherein the synchronization signal resets a respective counter of the respective annealing machine;

receive, from the parent device, control information that sets an upper limit for the respective counter;

increment the respective counter based on a respective internal clock of the respective annealing machine;

switch each operation performed by the respective annealing machine based on a value of the respective counter;

transmit a respective spin value of the respective annealing machine to other annealing machines in the plurality of annealing machines;

receive other respective spin values from the other annealing machines in the plurality of annealing machines, wherein the transmitting and the receiving comprise exchanging only spin values that correspond to spins adjacent across device boundaries of the plurality of annealing machines;

perform an update process for the respective spin value to form an updated respective spin value based on the other respective spin values, wherein the update process is executed during an interval from reset of the counter until the counter reaches the upper limit, and wherein the parent device adjusts the upper limit to trade off processing speed and accuracy;

perform a compression process on the updated respective spin value to form a compressed spin value, the compression comprising at least one of: (i) mapping a two-dimensional array of spin values to an image and performing irreversible image compression of the image, or (ii) transmitting update maps and/or differences from a previous state; and transmit the compressed spin value to the parent device.

2. The information processing system according to claim 1, wherein the parent device is a server that receives data to be processed by the plurality of annealing machines from a sensor.

3. The information processing system according to claim 1, wherein the compression process is performed by a data compression unit of the respective annealing machine.

4. The information processing system according to claim 3, wherein the compression process uses a difference from previous transmission data.

5. The information processing system according to claim 1, wherein the data to be processed by the plurality of annealing machines is generated based on the data received by the parent device, and the data received by the parent device is generated based on data detected by a sensor.

6. The information processing system according to claim 5, wherein the data to be processed by the plurality of the annealing machines is data obtained by rearranging the data received by the parent device.

7. The information processing system according to claim 5, wherein, prior to generating the data to be processed by the plurality of annealing machines, the parent device reorders the data received from the sensor into generation-time order using timestamps and associated source information, and outputs the reordered data for processing by the plurality of annealing machines.

8. The information processing system according to claim 1, wherein a coefficient of the plurality of annealing machines is obtained from an output of a function approximator or an output of a deep neural network that receives a sensor output.

9. The information processing system according to claim 1, wherein the compression process comprises mapping the two-dimensional array of spin values to the image and performing the irreversible image compression using spatial frequency conversion and quantization.

10. The information processing system according to claim 1, wherein the parent device adjusts the upper limit based on a required responsiveness of processing and a required accuracy of a solution obtained by the plurality of annealing machines.

11. The information processing system according to claim 1, wherein the data compression unit is configured to execute a plurality of compression processes including transmitting update maps and/or differences from a previous state and performing the irreversible image compression, and to select a preferable result among results of the plurality of compression processes for transmission.

12. An information processing method for improving real-time data processing and system control, the information processing method comprising:

receiving, by a respective annealing machine among a plurality of annealing machines, a synchronization signal that is broadcast by a parent device to each of the plurality of annealing machines, wherein the synchronization signal resets a respective counter of the respective annealing machine;

receiving, by the respective annealing machine from the parent device, control information that sets an upper limit for the respective counter;

incrementing, by the respective annealing machine, the respective counter based on a respective internal clock of the respective annealing machine;

switching, by the respective annealing machine, each operation performed by the respective annealing machine based on a value of the respective counter;

transmitting, by the respective annealing machine, a respective spin value of the respective annealing machine to other annealing machines in the plurality of annealing machines;

receiving, by the respective annealing machine, other respective spin values from the other annealing machines in the plurality of annealing machines, wherein the transmitting and the receiving comprise exchanging only spin values that correspond to spins adjacent across device boundaries of the plurality of annealing machines;

performing, by the respective annealing machine, an update process for the respective spin value to form an updated respective spin value based on the other respective spin values, wherein the update process is executed during an interval from reset of the counter until the counter reaches the upper limit, and wherein the parent device adjusts the upper limit to trade off processing speed and accuracy;

performing, by the respective annealing machine, a compression process on the updated respective spin value to form a compressed spin value, the compression comprising at least one of: (i) mapping a two-dimensional array of spin values to an image and performing irreversible image compression of the image, or (ii) transmitting update maps and/or differences from a previous state; and transmitting, by the respective annealing machine, the compressed spin value to the parent device.

* * * * *